(12) United States Patent
Seyboth et al.

(10) Patent No.: US 11,400,400 B2
(45) Date of Patent: Aug. 2, 2022

(54) SEPARATING UNIT HAVING AN IMPACTION SURFACE

(71) Applicant: DÜRR SYSTEMS AG, Bietigheim-Bissingen (DE)

(72) Inventors: Oliver Seyboth, Hemmingen (DE); Andreas Neu, Korntal-Münchingen (DE)

(73) Assignee: DÜRR SYSTEMS AG, Bietigheim (DE)

( * ) Notice: Subject to any disclaimer, the term of this patent is extended or adjusted under 35 U.S.C. 154(b) by 52 days.

(21) Appl. No.: 16/969,223

(22) PCT Filed: Mar. 12, 2019

(86) PCT No.: PCT/DE2019/100217
§ 371 (c)(1),
(2) Date: Aug. 12, 2020

(87) PCT Pub. No.: WO2019/174674
PCT Pub. Date: Sep. 19, 2019

(65) Prior Publication Data
US 2020/0406179 A1 Dec. 31, 2020

(30) Foreign Application Priority Data

Mar. 15, 2018 (DE) ...................... 10 2018 105 977.9
Jul. 9, 2018 (DE) ...................... 10 2018 116 526.9

(51) Int. Cl.
*B01D 45/00* (2006.01)
*B01D 45/08* (2006.01)
(Continued)

(52) U.S. Cl.
CPC ............. *B01D 45/08* (2013.01); *B01D 45/06* (2013.01); *B01D 45/16* (2013.01); *B05B 14/43* (2018.02);
(Continued)

(58) Field of Classification Search
CPC ........ B01D 45/08; B01D 45/06; B01D 45/16; B05B 14/43; B05B 14/44; B05B 16/40; Y02P 70/10
See application file for complete search history.

(56) References Cited

U.S. PATENT DOCUMENTS 1,519,428 A * 12/1924 Wilisch .................. B01D 45/08
159/31
1,678,844 A * 7/1928 Bradshaw .............. B01D 45/08
122/491
(Continued)

FOREIGN PATENT DOCUMENTS

DE 3521927 A1 1/1967
DE 8406088 U1 1/1989
(Continued)

OTHER PUBLICATIONS

International Search Report (dated May 28, 2019) for corresponding International App. PCT/DE2019/100217.
(Continued)

*Primary Examiner* — Dung H Bui
(74) *Attorney, Agent, or Firm* — WRB-IP LLP

(57) ABSTRACT

A separating stage for inertial separation of components contained in a fluid flowing through, in particular paint particles and/or paint agglomerates includes at least one separating segment, which has at least one acceleration section for the fluid on the inlet side, in which the fluid is accelerated in a through-flow direction, and a first impaction surface for components contained in the fluid is downstream of the acceleration section. A separating unit having at least one separating stage, a kit, a transport cart, a coating facility, and a method for producing a separating unit are also provided.

12 Claims, 18 Drawing Sheets

(51) Int. Cl.
    *B05B 14/43*     (2018.01)
    *B01D 45/06*     (2006.01)
    *B01D 45/16*     (2006.01)
    *B05B 14/44*     (2018.01)
    *B05B 16/40*     (2018.01)

(52) U.S. Cl.
    CPC ............... *B05B 14/44* (2018.02); *B05B 16/40* (2018.02); *Y02P 70/10* (2015.11)

(56) References Cited

U.S. PATENT DOCUMENTS

| | | | | |
|---|---|---|---|---|
| 1,807,378 A * | 5/1931 | Budil | ............... | B01D 45/08 55/482 |
| 1,916,528 A * | 7/1933 | Gwynne | ............... | B01D 45/08 55/423 |
| 2,221,073 A * | 11/1940 | Bubar | ............... | B01D 45/08 55/423 |
| 3,813,856 A * | 6/1974 | Jensen | ............... | B01D 45/08 55/444 |
| 3,870,494 A * | 3/1975 | Doane | ............... | B01D 45/08 55/DIG. 36 |
| 4,799,944 A * | 1/1989 | Dixon | ............... | B01D 45/08 55/529 |
| 4,872,892 A * | 10/1989 | Vartiainen | ............... | B01D 45/16 55/447 |
| 4,944,782 A * | 7/1990 | Rajendran | ............... | F24C 15/2035 55/444 |
| 4,955,990 A * | 9/1990 | Napadow | ............... | B01D 45/08 55/482 |
| 4,992,085 A * | 2/1991 | Belin | ............... | F23C 10/18 55/444 |
| 5,302,174 A * | 4/1994 | Guetersloh | ............... | B01D 45/08 55/444 |
| 5,318,609 A * | 6/1994 | Kittler | ............... | B01D 45/08 55/445 |
| 5,320,656 A * | 6/1994 | Hammer | ............... | F24C 15/2035 55/444 |
| 5,342,422 A * | 8/1994 | Wimbock | ............... | B01D 45/08 55/444 |
| 5,352,257 A | 10/1994 | Powers | | |
| 5,384,100 A * | 1/1995 | Freund | ............... | B01J 35/04 502/527.22 |
| 6,290,742 B1 * | 9/2001 | Pakkala | ............... | B01D 45/08 55/465 |
| 6,454,824 B1 * | 9/2002 | Maryamchik | ............... | B01D 45/08 55/444 |
| 6,464,825 B1 | 9/2002 | Cheimets et al. | | |
| 6,833,022 B2 * | 12/2004 | Feisthammel | ............... | B01D 53/261 96/138 |
| 7,166,140 B2 * | 1/2007 | Entezarian | ............... | B01D 45/08 55/440 |
| 8,157,894 B2 | 4/2012 | Kwok et al. | | |
| 9,403,106 B2 * | 8/2016 | Oosthuizen | ............... | B01D 45/16 |
| 10,300,426 B2 * | 5/2019 | Salpietra | ............... | B01D 46/10 |
| 2002/0189213 A1 * | 12/2002 | Neuschwander | ............... | B01D 45/08 55/423 |
| 2003/0136095 A1 | 7/2003 | Walker et al. | | |
| 2005/0000199 A1 * | 1/2005 | Carter | ............... | B01D 45/08 55/442 |
| 2005/0028498 A1 * | 2/2005 | Entezarian | ............... | B01D 50/20 55/467 |
| 2007/0163216 A1 * | 7/2007 | Smasal | ............... | B01D 45/08 55/446 |
| 2007/0293133 A1 * | 12/2007 | Marcotte | ............... | F24C 15/2035 454/67 |
| 2008/0202083 A1 * | 8/2008 | Graham | ............... | B01D 45/08 55/444 |
| 2011/0214565 A1 * | 9/2011 | Kwok | ............... | F24C 15/2035 95/267 |
| 2014/2002332 | 7/2014 | Link et al. | | |
| 2014/0345461 A1 * | 11/2014 | Sikkenga | ............... | B01D 45/08 95/267 |
| 2015/0021002 A1 * | 1/2015 | Hoglund | ............... | F28F 3/046 165/166 |
| 2015/0101588 A1 * | 4/2015 | Yoon | ............... | B01D 45/08 126/299 D |
| 2015/0362196 A1 * | 12/2015 | Chen | ............... | F24C 15/2035 55/440 |

FOREIGN PATENT DOCUMENTS

| | | |
|---|---|---|
| EP | 3034150 A1 | 6/2016 |
| GB | 2495904 A | 5/2013 |
| WO | 9117813 A1 | 11/1991 |

OTHER PUBLICATIONS

German Search Report (dated Mar. 14, 2019) for corresponding German App. 10 2018 116 526.9.

* cited by examiner

SEPARATING UNIT HAVING AN IMPACTION SURFACE

BACKGROUND AND SUMMARY

The invention relates to a separating stage for inertial separation of components contained in a fluid flowing through it, in particular paint particles and/or paint agglomerates and also a separating unit having at least one such separating stage.

Inertial separators for separating dust particles or liquid droplets from a gas flow are generally known. The inertial separators are generally made up of multiple very simply shaped flow bodies, for example tubular half-shells or trapezoidal bent sheets, which are arranged in the gas flow in such a way that they form a flow labyrinth.

Various inertial separators are also already available on the market especially for the separation of paint overspray from the exhaust air or recirculated air from painting facilities. These are often disposable separating units that are made of cardboard or plastic, for example, and are disposed of as a whole as soon as they are fully loaded with paint. These disposable separators have standard external dimensions from approximately 500×500×500 mm to approximately 1200×800×2000 mm. They are used in both the industrial painting field and also in automobile body painting. Since the known inertial separators have only a limited separation efficiency, additional downstream filters are generally used for the fine purification of the gas flow.

In WO 2013/013780 A1, for example, a separating device having a filter unit is disclosed, which is designed as an inertial filter. The separating device comprises a plurality of separating elements which are arranged in such a way that a flow labyrinth is formed. The separating elements extend vertically and have flow through them in the horizontal direction, wherein the distance of the separating elements from one another is less in the through-flow direction. For example, filter plates, filter sleeves, compartment structures, or chamber structures are available as separating elements.

It is desirable to provide a separating stage for inertial separation having improved separation efficiency over the prior art.

It is also desirable to provide a separating unit having at least one such separating stage.

The invention is directed according to one aspect of the invention to a separating stage for inertial separation of components contained in a through-flowing fluid, in particular paint particles and/or paint agglomerates.

It is proposed that at least one separating segment be provided, which has at least one acceleration section for the fluid on the inlet side of the separating stage, in which the fluid is accelerated in a through-flow direction, and that a first impaction surface for components contained in the fluid is downstream of the acceleration section.

A fluidically optimized geometric structure for inertial separation can advantageously be implemented in the separating stage, in particular the geometric structure of a labyrinthine flow path having favorable through flow. The largest possible free flow cross section can be provided along an impaction surface, on which significant paint accumulation is to be expected. In spite of the inherent goal conflict of high separation efficiency and low pressure loss, the highest possible separation efficiency with the lowest possible pressure loss can be achieved by a fluidically optimized separating structure. The impaction surface is preferably arranged having a baffle portion transverse to the outlet of the acceleration section.

The separating stage can comprise a single separating segment, which has an incident flow surface, away from which the acceleration section extends to the impaction surface. The separating stage can optionally comprise multiple separating segments. The separating segments can optionally have incident flow in parallel. The separating segments can be aligned. Optionally, separating segments can also be offset in relation to one another such that one or more separating segments are arranged geometrically behind other separating segments with respect to the incident flow direction of the fluid, but all separating segments can have incident flow in parallel.

A high storage capacity for separated paint can also optionally be achieved by a suitable and need-adapted shaping and arrangement of acceleration section and impaction surface. This is equivalent with a through-flow resistance of the separating stage which increases only slightly due to increasing paint load.

In particular, the separating stage can be assigned an x-axis, a y-axis, and a z-axis, which are each perpendicular to one another.

The main through-flow direction of the fluid in the acceleration section is to be understood as an imaginary straight connection between inlet side and outlet side of the acceleration section, wherein the flow enters the acceleration section on the inlet side and exits again on the outlet side, which is opposite to the inlet side, independently of whether one or more reversals of direction take place in the interior of the acceleration section.

The x-axis corresponds to the main through-flow direction.

The free flow cross section is arranged along the y-axis at the entry of the fluid into the acceleration section between incident flow surfaces of the separating stage.

For example, the x-axis can correspond to a longitudinal axis of the acceleration section, the z-axis to a vertical axis, and the y-axis to a transverse axis.

The acceleration section is advantageously designed as a nozzle having a large free flow cross section at the entry of the fluid into the acceleration section, which tapers in the through-flow direction. The free flow cross section at the entry of the fluid into the acceleration section is parallel to the y-axis and z-axis.

The acceleration section is advantageously rectangular.

In particular, the free flow cross section at the entry of the fluid into the acceleration section is rectangular.

The free flow across section at the entry into the acceleration section is at least equal, preferably 1.5 times as large, particularly preferably at least twice as large in the direction of the z-axis as in the direction of the y-axis.

Implementing the separating stage as a disposable separator, which is preferably produced from combustible recycling material, is advantageous.

Due to the improved separation efficiency, downstream filter stages having depth filters to achieve the typical purified gas requirements can be omitted.

However, such downstream filter stages can optionally be provided, with the advantage that the improved separation efficiency reduces their loading during operation and their service life is extended accordingly.

According to a favorable design of the separating stage, the first impaction surface can have a baffle region and a curved portion following in the flow direction to deflect the direction of the fluid by at least 45°, preferably at least 180° with respect to the through-flow direction of the fluid in the acceleration section.

Optionally, the first impaction surface can be formed continuously along the curved portion. Optionally, the curvature of the curved portion can be constant. Alternatively, the radius of curvature can be changeable along the curved portion, in particular it can become smaller.

The curved portion can be curved smoothly rounded, having a continuous curvature. The curved portion can optionally also be formed by straight surface segments in the form of a polygon, wherein adjacent surface segments enclose a suitable angle with one another.

The acceleration section in the separating stage according to the invention effectuates deliberate acceleration of the particles contained in the gas flow in the direction toward the impaction surface. Multiple and sharp flow deflections can be avoided, which, in known inertial separators, can result in an unfavorable ratio of the separation efficiency to the through-flow pressure loss. Known inertial separators having flat or convex impaction surfaces generally have a low separation efficiency, since particles which were not deposited immediately upon impact of the flow on the impaction surfaces can then easily pass this impaction surface without coming into contact with it. Paint particles/agglomerates deposited on such impaction surfaces can moreover be detached again and entrained easily by the overflow. This can be avoided in the separating stage according to the invention.

The separating stage consists of or comprises at least one geometric structure which effectuates an acceleration of the gas/paint mist mixture flowing through to a local maximum in the direction of the impaction surface and also a subsequent deflection of the flow by at least 45°, preferably by more than 180°, to use the inertial forces and/or centrifugal forces to deposit the particles on the impaction surface.

The geometric structure permits high flow velocities and accelerations to be generated only where they are needed for the separation. Only a few flow deflections are advantageously necessary. Flow deflections that are not used directly for acceleration in the direction of an impaction surface can be carried out with as little pressure loss as possible. In order to use the centrifugal forces occurring in the event of flow deflections for particle separation, the impaction surface is formed continuously along the outer radius of the curved portion thereof. The largest possible free flow cross sections can be provided along the impaction surfaces, on which significant paint accumulation is to be expected.

According to a favorable design of the separating stage, the baffle region can be opposite to the outlet-side end of the acceleration section and the distance between outlet-side end and baffle region can be at least half of a width of the acceleration section in the narrowest cross section. It has been shown that a smaller distance would increase the pressure loss and the impaction surface would clog quickly due to deposited paint.

The distance is defined as the greatest distance from the narrowest cross section of the acceleration section to the baffle region.

The baffle region is preferably at a distance of at least half of the clear width of the narrowest cross section of the acceleration section from this section.

Due to the stability and a reduced pressure loss, the baffle region can preferably be round, in particular concave with respect to the outlet of the acceleration section. The region of the impact region opposite to the acceleration section then has a tip which is directed against the flow.

Alternatively, the baffle region can be flat. The baffle region can in particular be arranged perpendicular to the through-flow direction of the acceleration section. Coming from the acceleration section, the fluid strikes the baffle region and is deflected toward the curved portion of the impaction surface.

The distance between outlet opening of the acceleration section and baffle region can advantageously be selected in accordance with typical operating conditions to which the separating stage is subjected. If the impaction surfaces are arranged too close after the acceleration section, the absorption capacity is low, since the free flow cross section over the impaction surface is quickly clogged by deposited paint.

If the distance is too large, the separation effect diminishes since sufficient time remains for the particles to follow the flow lines of the fluid flow along the baffle region and the curved portion of the impaction surfaces.

The acceleration section can advantageously be designed such that an average velocity of the fluid at the narrowest cross section of the acceleration section is in the range of 5 m/s to 20 m/s. If the highest possible degrees of separation are to be achieved, velocities of approximately 15 m/s have proven to be advantageous. On the other hand, if a coarse separation is to take place with the lowest possible pressure loss, velocities of approximately 10 m/s have proven to be advantageous.

According to a favorable design of the separating stage, a ratio of a free incoming flow area in the narrowest cross section of the acceleration section to the cross-sectional area before the acceleration section is to be in the range of 1:4 to 1:10, in particular in the range of 1:6 to 1:8. The cross-sectional area is to be understood as the cross-sectional area of the separating segment perpendicular to a main through-flow direction. In particular, the cross-sectional area before the acceleration section can be the free flow cross section at the entry of the fluid into the acceleration section.

This results in a favorable separation efficiency with a relatively low pressure drop. This cross-sectional area is also referred to below as the incident flow surface. If the separating stage has multiple separating segments which can have incident flow in parallel, the incident flow surface is the total of the cross-sectional areas of the separating segments.

The main through-flow direction of the fluid is to be understood as an imaginary straight connection between inlet side and outlet side of the separating stage, wherein the flow enters the separating stage on the inlet side and exits again on the outlet side, which is preferably opposite to the inlet side, independently of whether one or more reversals of direction take place in the interior of the separating stage.

According to a favorable design of the separating stage, a ratio of a width to a depth of the impaction surface can be at least 1:2, preferably between 1:2 and 3:1, particularly preferably 2:1. The depth of the impaction surface is the greatest distance from the baffle region to the tallest elevation of the curved portion of the impaction surface. The width is to be understood as the clear width of the impaction surface perpendicular to the through-flow direction of the acceleration section.

According to a favorable design of the separating stage, a second impaction surface can be downstream of the first impaction surface. Optionally, the second impaction surface can have a curved portion for further directional deflection of the fluid. Optionally, the curved portion of the second impaction surface can have a curvature opposite to the first curved portion. A reverse deflection of the flow of the fluid by at least 180° in the guiding direction opposite to the first direction back into the incoming flow direction can preferably take place. The reverse deflection in the opposite guiding direction advantageously increases the separation efficiency, since particles which have passed the first deflection far away from the first impaction surface are thus located close to the outer wall guiding the reverse deflection upon the reverse deflection, which wall is used as the second impaction surface, and can easily accumulate there.

The second impaction surface can advantageously be an outer wall of the separating stage for guiding the fluid. In particular, the second impaction surface can be a rear side of a boundary wall of the acceleration section. This enables a compact design having few components, since various regions of the same component can be used differently. For example, the inside of the acceleration section is used to accelerate a fluid and the outside of the acceleration section is used as a second impaction surface, in particular as its curved portion.

In particular, alternatively or additionally, a wall can be arranged transverse to the overflow direction at the end of the curved portion fluidically after the second impaction surface. This wall is used as an additional impaction surface to utilize the centrifugal forces acting on the particles during the deflection.

Upon the reverse deflection of partial flows of the adjacent first impaction surfaces, this continuous wall represents a partition wall between partial flows of adjacent separating segments of the separating stage to be directed toward one another. The partial flows of two adjacent separating segments flow toward the shared partition wall and thus also toward one another before they are deflected further and flow further on both sides of the partition wall in parallel in the direction of the outlet of the separating stage.

A reverse deflection of the flow of the fluid can advantageously take place on the second impaction surface in a deflection direction which is opposite to the deflection on the first impaction surface.

According to a favorable design of the separating stage, the fluid can be divided at the baffle region of the impaction surface into partial flows having different deflection directions. In particular, the partial flows can be divided having different deflection directions. If the acceleration section is rectangular or elongated at its outlet-side end, for example, one part of the fluid flow can be deflected to one side and the other part of the fluid flow to the opposite side. After the impact, a preferably symmetrical division of the fluid flow entering through the acceleration section into partial flows having different, preferably opposing deflection direction can take place.

According to a favorable design of the separating stage, the curved portion of the first impaction surface can have an inner radius on the outlet side which is at least one-fourth of a width of a free flow cross-section at the outlet-side end of the curved portion. This is particularly advantageous in the case of deflections of the fluid flow by greater than 90° to minimize the pressure loss.

To achieve a significant reduction of the pressure loss, the inner radius can be at least half of the width of the free flow cross section. The free flow cross section is the smallest flow cross section between inner radius and second impaction surface or the boundary wall/partition wall.

According to one advantageous design of the separating stage, one or more collection regions can be arranged at one or more overflowed inner radii and/or at one or more end edges of overflowed walls, which can be open toward the overflow direction, and/or surfaces of overflowed walls can have a three-dimensional structure, preferably a wavy structure, and/or one or more depressions and/or increased roughness. Structures of this type permit entrainment of paint particles or agglomerates already deposited on the impaction surface to be prevented. As a result, the separation efficiency can be increased further.

According to one advantageous design of the separating stage, impaction surface and/or acceleration section can be formed from cardboard and/or corrugated cardboard and/or fiber molded parts and/or plastic deep-drawn parts. In this way, blanks can be provided which can be formed without undercuts due to the production process and can therefore be stacked well. A simple construction from the fewest possible components to be transported compactly is possible. This in turn enables low transport costs, a low storage volume, and rapid assembly of the separating stage on location. In particular, multiple separating stages can be assembled to form a separator unit.

The flexible adaptability of the separating stage tospecial, in particular rheological properties of the fluid flow to be treated is advantageous, in particular a so-called overspray to be separated therefrom in a painting facility, using the smallest possible number of different components. Components of the separating stage can advantageously be made available as a kit.

According to one favorable design of the separating stage, at least two separating segments which have flow through them in parallel can be provided, the respective acceleration sections and first impaction surfaces of which are separated from one another by a wall.

Each separating segment of the separating stage can advantageously comprise a geometric structure or consist thereof, which effectuates once or multiple times an acceleration of the fluid flowing through it, in particular a gas-paint mist mixture, to a local maximum in the direction toward an impaction surface and a subsequent deflection of the fluid flow by at least 45°, preferably by greater than 180° to utilize the inertial forces or centrifugal forces to separate the particles from the fluid flow on the impaction surface. The geometric structure permits high flow velocities and accelerations to be generated deliberately and locally only where they are used for the separation. Only a few flow deflections need to be generated. Flow deflections that are not used directly for acceleration in the direction of an impaction surface can be carried out with as little pressure loss as possible. The largest possible free flow cross sections can be provided along the impaction surfaces, on which significant paint accumulation is to be expected.

Each separating stage can be distinguished by a certain separation efficiency and a certain absorption capacity for particles, in particular paint particles, by means of its geometric structure, but can be different depending on process conditions, defined, inter alia, by the composition and properties of the fluid, such as the type of paint, droplet size distribution, air conditions, painting process.

According to a further aspect of the invention, a separating unit is proposed having at least one separating stage according to the invention. The at least one separating stage of the separating unit is arranged in a housing.

A simple structure which is easy to standardize results due to the housing, which permits easy replacement of used separating stages by simply removing the housing having the one or multiple separating stages and replacing it with a housing having unused separating stages.

According to one advantageous design of the separating unit, multiple separating stages can be arranged so they can have flow through them fluidically in parallel and/or in series.

According to one advantageous design of the separating unit, a guide element can be arranged in front of or in the free flow cross section of the acceleration section. The guide element can be used to minimize noise during the flow through the separating unit. This is particularly advantageous in the case of separating units which are not yet heavily loaded.

The guide element can advantageously be provided detachably from the separating unit. In this way, the guide element can be removed from the separating element to better utilize the capacity of the separating unit in the event of prolonged use.

The guide element can influence the through flow such that a noise development can be reduced or substantially suppressed.

By way of suitable positioning and/or shaping of the guide element, it can advantageously induce swirling of the inflowing fluid, for example, inflowing air, and/or a reflection of the sound generated after the acceleration section.

According to one advantageous design of the separating unit, the guide element can extend in parallel to the incident flow surface of the separating stage and/or the guide element can be arranged in a plane of symmetry of the free flow cross section. The guide element can be flat, angled, or curved in cross section. An angled or curved cross section increases the stability of the guide element.

Advantageously, the guide element can taper to a point against the incident flow direction or can be convexly curved. This shape is favorable for a low flow resistance of the guide element.

Optionally, the guide element can be provided as a one-piece additional element, which can be added or left out if needed during the construction of the separating stage or separating unit.

According to one advantageous design of the separating unit, the housing can have an opening having an upper edge and a lower edge on its incident flow side, wherein the edges are formed having different heights.

A reservoir can be provided by the elevated edge at the lower region of the housing to collect components separated from the fluid, such as paint residues.

A favorable height of the lower edge of the housing is at least 1.5 times, preferably twice as large as a height of the opposing upper edge of the housing.

With dimensions of the housing having edge lengths of approximately 500 mm, a height of the upper edge between 20 mm and 40 mm is favorable and a height of the lower edge between 40 mm and 100 mm, preferably between 50 mm and 80 mm.

According to one advantageous design of the separating unit, at least one filter stage, in particular a filter stage designed as a depth filter, for the fluid flow can be arranged downstream of at least one of the separating stages, in particular after the last separating stage. The filter stage can advantageously be provided for fine purification of the fluid. The separating unit can be adapted for various applications, for example, depending on a required degree of separation and/or volume flow to be treated and/or process conditions, by selecting from an assortment of suitable separating stages and parts and arranging them in suitable sequence adjacent to one another and/or in succession.

According to one favorable design of the separating unit, the at least one filter stage can have a folded filter bellows, the fold edges of which are oriented transversely to an extension of the acceleration section extending in the direction of the z-axis.

The fold edges preferably extend in the direction of the y-axis of the separating stage.

This permits the fluid flowing out of the separating stage or the separating stages to be evened out on at least a part of the filter surface of the filter stage. This preferably permits the fluid flowing out of the separating stage or the separating stages to be evened out on the entire filter surface of the filter stage. The acceleration section has, for example, the shape of an elongated, in particular slot-like, funnel.

Optionally, the filter stage can be provided in a common housing with one or more separating stages.

The filter stage can advantageously have a filter class G2. Filter class G2 means that the filter stage has an average degree of separation of 65%-80% for particles <10 μm.

Paint mist separators made of glass fiber material or filter mats made of polyester nonwoven material are advantageous as material for the filter bellows.

The wavy shape of the folded filter bellows can optionally be stabilized by a support structure in the housing.

According to one favorable design of the separating unit, the at least one separating stage and one or more filter stages can be arranged in a common housing. Like the components of the separating stages, the housing can consist of or comprise a blank made of suitable material, for example cardboard, and can be folded appropriately. For example, a multistage separating unit having a plurality of separating stages can be manufactured from only three basic elements, such as a component for incident flow surface having acceleration section, a component having impaction surfaces, and a component having support frame.

According to one favorable design, separating units and filter stages can be connected in series in succession in the through-flow direction. Upstream separating units and downstream filter stages can be arranged in separate housings which are fluidically connected.

The upstream separating units, as coarse separators, can remove 70% to 95% of the components contained in the fluid, in particular paint residues, and the fluid can then be further purified by a downstream filter stage having a filter material of filter class G2 or the like.

Optionally, a separate upstream separating unit can have one or more separating stages and one or more filter stages arranged in succession in a housing.

Successive housings can advantageously be connected to one another in a fluid-tight manner. For practical use, taping over the connection point with a tight adhesive strip can be sufficient.

According to one advantageous design of the separating unit, a bottom part and/or cover part can have a negative contour which corresponds to the walls of a cross section to have flow through it of one or more separating stages and which is used as a holder for the one or more separating stages. The negative contour can be predetermined, for example, by depressions, holding nubs, and the like in the form of the horizontal cross section of the separating stages to have flow through it. The components for the walls and/or acceleration sections and/or impaction surfaces can simply be inserted into these negative contours and held in shape.

The negative contour can be arranged on an inside of the bottom part and/or cover part. The negative contour can be predetermined by depressions, holding nubs, etc., into which the components can be inserted.

The negative contour can optionally be formed as interrupted openings in the bottom part and/or cover part, through which the components can be inserted.

According to a further aspect of the invention, a kit is proposed for producing a separating unit according to the invention. Components are formed from blanks made of cardboard and/or corrugated cardboard and/or fiber molded parts and/or deep-drawn parts made of plastic, which can be bent or buckled into the final shape and/or can be inserted into one another.

According to one favorable design of the kit, a bottom part and/or cover part can have a negative contour in the form of a cross section to have flow through it of one or more separating stages as a holder for the separating stages.

The kit can advantageously consist exclusively of blanks made of cardboard or corrugated cardboard, each comprising a bottom part and a cover part, which can be formed identically, and can consist of or comprise multiple wall parts.

Bottom part and cover part can have cutouts to accommodate the wall parts, preferably in the form of negative contours, which completely or partially emulate the shape of the horizontal cross section of the separating structure to have flow through it, such as incident flow surfaces, acceleration sections, baffle regions, impaction surfaces, and the like. These cutouts are used both for fixing and also shaping or stabilizing the shape of the wall parts which are inserted into them.

In the case of interrupted negative contours, the wall parts have corresponding teeth on the upper and lower edges thereof, which are connected to the bottom part or the cover part.

The kit for a separating stage and/or a separating unit can advantageously comprise multiple identical components, whereby the logistics expenditure and production and storage costs can be reduced. The separating stage can be constructed from multiple, for example, one to ten components in this case, which are each embodied as flat blanks or three-dimensionally shaped sheets. An optional filter stage can be constructed by folding, by insertion into one another, or by arrangement in succession of the components or by a combination of these measures.

The flat blanks can advantageously have bending lines and/or folding lines to facilitate the shaping during the assembly. Curved portions are then formed like polygons.

The components can optionally have bulges (spacers) to reinforce the structure, in particular to support upstream wall parts on downstream wall parts.

A kit of components can optionally be designed so that multiple different separating stages are alternatively producible from it. The components can preferably be blanks made of cardboard or corrugated cardboard and/or fiber molded parts and/or deep-drawn parts made of plastic. Due to the production process, fiber molded parts or deep-drawn parts are formed without undercuts and therefore can be stacked well. All components can therefore be transported in a space-saving manner.

According to a further aspect of the invention, a transport cart having at least one separating unit according to the invention is proposed. The transport cart is characterized by a movable or displaceable design for coupling to a coating facility.

According to one favorable design of the transport cart, the at least one separating unit can be provided so it is interchangeably arranged. A loaded separating unit, which typically has a high weight, can advantageously also be removed easily using the transport cart. This applies all the more if multiple separating units are arranged in the transport cart, which have a high weight in total.

According to a further aspect of the invention, a coating facility having at least one transport cart according to the invention is proposed. At least one transport cart is provided to form a fluid-conducting connection to an exhaust air duct. Exhaust air containing paint mist can advantageously flow through the at least one transport cart.

According to one favorable design of the coating facility, a plurality of transport cards can be provided that can be coupled on in parallel. A high throughput of fluid can be achieved in the coating facility. The movable transport carts can advantageously be exchanged during production in the coating facility.

According to a further aspect of the invention, a method is proposed for producing a separating unit according to the invention having at least one separating stage according to the invention, wherein a kit made up of components is provided, in particular made up of blanks made of cardboard and/or corrugated cardboard and/or fiber molded parts and/or deep-drawn parts made of plastic; components are taken from the kit; components are shaped to form at least one incident flow surface, at least one acceleration section, and at least one impaction surface; the shaped components are inserted into a corresponding negative shape of bottom part and/or cover part; the assembly of the at least one incident flow surface, the at least one acceleration section, and the at least one impaction surface having bottom part and cover part is inserted into a housing.

According to one favorable design of the method, at least one filter stage, in particular a depth filter, can be inserted into the housing downstream in the through-flow direction of the at least one separating stage.

The production from the kit allows a particularly space-saving transport size of the separating unit, which can be constructed very easily on location. Space-saving storage on location is possible.

BRIEF DESCRIPTION OF THE DRAWINGS

Further advantages result from the following description of the drawings. Exemplary embodiments of the invention are illustrated in the drawings. The drawings, the description, and the claims contain numerous features in combination. A person skilled in the art will expediently also consider the features individually and combined them to form further meaningful combinations.

In the exemplary figures.

DETAILED DESCRIPTION

Components that are the same or have the same function are identified in the figures with the same reference signs. The figures only show examples and are not to be understood as restrictive.

Directional terminology used hereinafter with terms such as "left", "right", "top", "bottom", "in front", "behind", "after" and the like is used only for better comprehension of the figures and is not to represent a restriction of the generality in any case. The components and elements shown, and their design and use can vary in terms of the considerations of a person skilled in the art and can be adapted to the respective applications.

Figure 1:
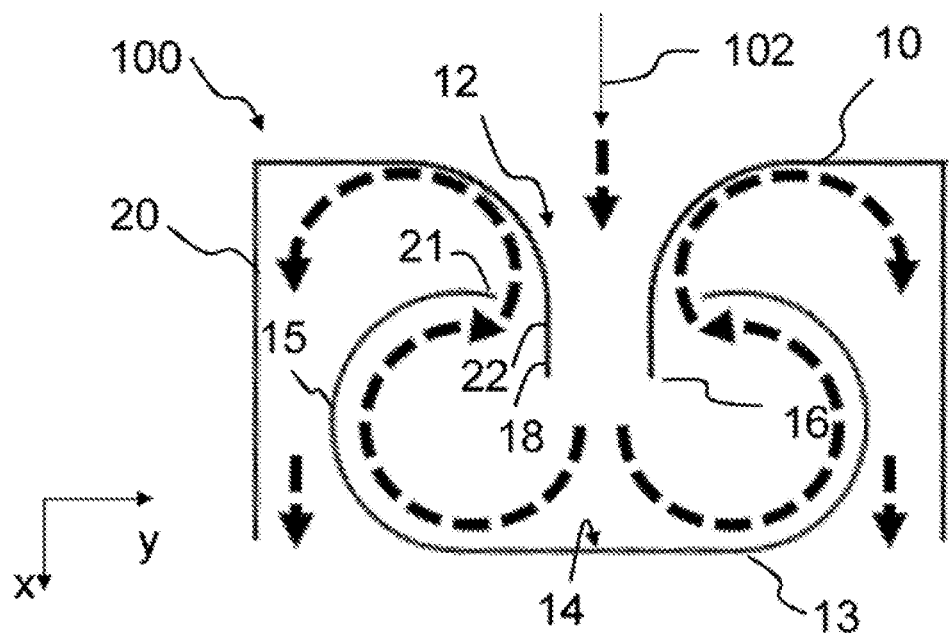
FIG. 1 shows a cross section through a separating stage including a separating segment according to one exemplary embodiment of the invention having an inlet-side acceleration section followed by a first impaction surface having fluid flow deflection on a curved portion and a second impaction surface having opposing fluid flow deflection on a portion curved in the opposite direction.
Figure 2:
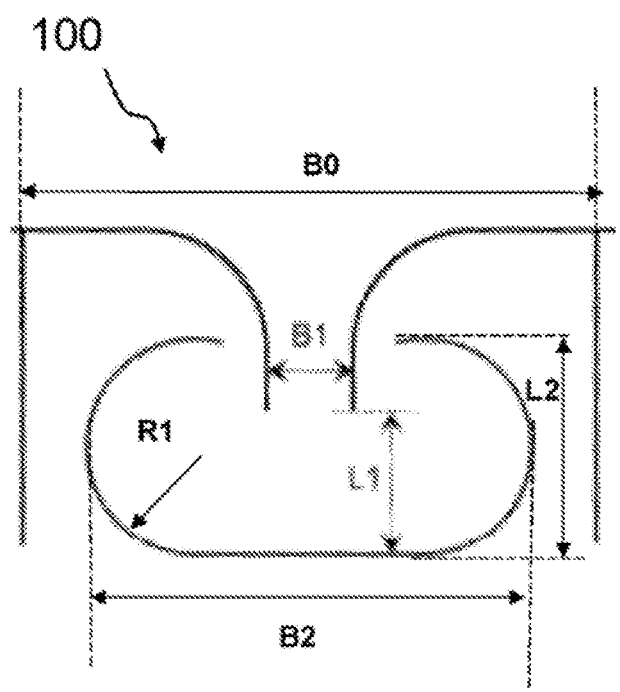
FIG. 2 shows the cross section from FIG. 1 with explanation of various parameters.

FIG. 1 shows a cross section through a separating stage 100 according to one exemplary embodiment of the invention and FIG. 2 shows the cross section of the separating stage 100 from FIG. 1 with explanation of various parameters of the elements of the separating stage 100 only identified by reference signs in FIG. 1.

The separating stage 100 has an incident flow surface 10 and an acceleration section 12, for example, a nozzle, on the inlet side, followed by a first impaction surface 13 having fluid flow deflection on a first curved portion 15. The incident flow surface 10 forms a cross-sectional area in front of the acceleration section 12.

A coordinate cross x, y is indicated for orientation. The x-axis corresponds to a longitudinal axis, which is preferably a main through-flow direction of the acceleration section 12. In this example, the y-axis corresponds to a transverse axis, along which the incident flow surface 10 and a free flow cross section are arranged at the entry of the fluid into the acceleration section 12. The z-axis is oriented perpendicular to the image plane and in this example corresponds to a vertical axis of the separating stage 100. In this exemplary embodiment, the separating stage 100 is formed by a single separating segment.

A person skilled in the art understands that the y-axis would form the vertical axis and the z-axis the transverse axis if the separating stage 100 were rotated, for example, by 90° about the x-axis.

The cross-sectional area is to be understood as the cross-sectional area of the separating segment perpendicular to a main through-flow direction.

The main through-flow direction is to be understood as an imaginary straight connection between inlet side and outlet side of the separating stage. The flow enters the separating stage at the inlet side and exits again at the outlet side, which is opposite to the inlet side in this example, independently of whether one or more reversals of direction take place in the interior of the separating stage 100.

The incident flow surface 10 merges into the wall of the acceleration section 12. The acceleration section 12 is oriented having its open end 16 toward a baffle region 14 of the first impaction surface 13 which is arranged at a distance transversely thereto. The curved portion 15 of the first impaction surface 13 follows a second impaction surface 18 with opposing fluid flow deflection on a further portion 22 curved in the opposite direction to the first. The fluid flow is indicated by straight and rounded thick arrows.

The fluid, for example, a mixture of air and paint particles and paint agglomerates from a painting facility, is incident on the incident flow surface 10, which has a width B0, and enters the acceleration section 12 of the separating stage 100 in a through-flow direction 102 in the direction of the x-axis. For simplification, it is ignored here that the part of the fluid which is incident on the incident flow surface 10 experiences a deflection into the acceleration section 12 due to the rounded profile of the acceleration section 12 at the entry of the fluid into the acceleration section 12. At the narrowest point of the acceleration section 12, it has a width B1 in the direction of the y-axis.

The distance from the end 16 of the acceleration section 12 to the opposite baffle region 14 of the impaction surface 13 is identified by L1. In this example, the acceleration section 12 also has the width B1 at the end 16. If the width of the acceleration section 12 were to widen again towards the end 16, the distance L1 would be determined from the narrowest point having the width B1, specifically from the end of the region having the narrowest width B1 which is closest to the end 16 of the acceleration section 12.

The incoming fluid flow is divided symmetrically to the longitudinal direction of the acceleration section 12 in the transverse direction on both sides into two partial flows flowing away from each other and deflected outward from the end 16 of the acceleration section 12. The portion 15 of the first impaction surface 13 curved uniformly having a radius R1 follows on both sides on the baffle region 14, which is flat in this example. The region of the first impaction surface 13 opposite to the acceleration section 12 is flat.

The end edge 21 of the curved portion 15 is oriented toward a second impaction surface 18, which has a curved portion 22. The second impaction surface 18 is advantageously formed by the outside of the acceleration section 12. The distance between the end edge 21 and the baffle region 14 is referred to as the depth L2 of the first impaction surface 13.

The incoming fluid is accelerated in the acceleration section 12 and deflected after the baffle region 14 on the left side of the figure clockwise in accordance with the curvature of the curved portion 15 and counterclockwise on the opposing right side. The deflection is at least 45°, preferably greater than 180°, here 270°, with respect to the through-flow direction 102. The deflection by greater than 180° increases the probability of a wall contact for the particles in the fluid flow, so that the separation efficiency is increased.

The fluid flow is further deflected at the second impaction surface 18, which is arranged having an entry region transverse to the first curved portion 15. The curved portion 22 of the second impaction surface 18 is curved in the opposite direction to the first curved portion 15 of the first impaction surface 13. The fluid flow is deflected further there counterclockwise on the left side in the figure and clockwise on the right side of the figure, so that the fluid flow flows into the boundary section 12 opposite to the original through-flow direction 102 at the beginning of the impaction surface 18 and is finally deflected further in the direction of the x-axis at a boundary wall 20. The two partial flows leave the separating stage 100 in the original through-flow direction 102.

Particles from the fluid can easily be deposited on the curved portions 15, 22 due to the deflection of the centrifugal forces prevailing on the curved portions 15, 22. After the first deflection on the first impaction surface 13, particles that are located far from this surface in the fluid flow necessarily come into the vicinity of the second impaction surface 18 during the second deflection on the second impaction surface 18 and can easily be deposited there and thus removed from the fluid flow.

The distance L1 between the acceleration section 12 and the impaction surface 13 arranged behind it is at least half of the width B2 in the narrowest cross-section of the acceleration section 12. A shorter distance L1 results in an increased pressure loss and the structure would be rapidly clogged by deposited paint. The ratio of the width B2 to the depth L2 of the first impaction surface 13 is between 1:2 and 3:1. A ratio of greater than 1.5:1, in particular approximately 2:1, has proven to be particularly advantageous for the flow guiding.

The mean inflow velocity in the narrowest cross section of the acceleration section 12 is preferably 5 m/s to 20 m/s. If the highest possible degrees of separation are to be achieved, velocities of approximately 15 m/s have proven to be advantageous. On the other hand, if a coarse separation is to take place with the lowest possible pressure loss, velocities of approximately 10 m/s have proven to be advantageous.

It is advantageous if a clear width B1 of the acceleration section 12 of the separating stage 100 is at least 20 mm at the narrowest point in order to prevent clogging of the acceleration section 12 due to adhering particles, for example paint deposits from painting facilities. For paints that form particularly voluminous agglomerates during the deposition, which is typical, for example, for water-based base coats, the clear width B1 is preferably at least 40 mm.

Figure 3:
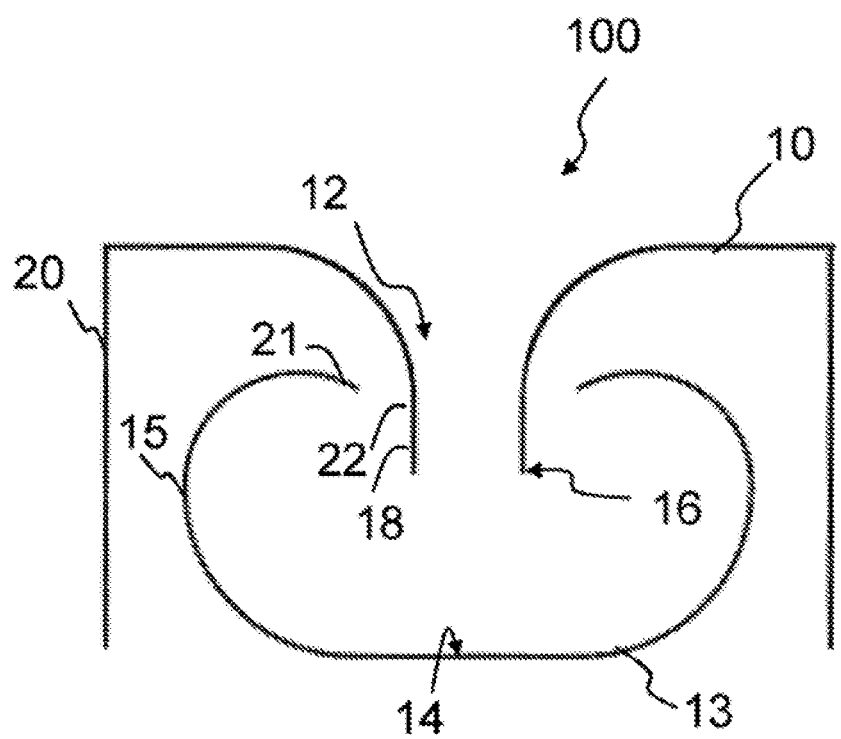
FIG. 3 shows a cross section through a separating stage including a separating segment according to a further exemplary embodiment of the invention having an inlet-side acceleration section followed by a first impaction surface having fluid flow deflection on a curved portion with increasing curvature along the impaction surface and a second impaction surface having opposing fluid flow deflection on a curved portion.

FIG. 3 shows a cross-section through a separating stage 100 formed by a single separating segment according to a further exemplary embodiment of the invention having an inflow-side acceleration section 12 followed by a first impaction surface 13 having a first curved portion 15 for fluid flow deflection of the impaction surface 13 and a second impaction surface 18 having opposing fluid flow deflection at a second curved portion 22. As a refinement of the separating stage 100 from FIG. 1, to increase the separating efficiency, the curvature can increase along the curved portion 22, i.e., the radius of curvature of the first impaction surface 13 can become smaller in the deflection direction to accelerate the fluid flow in the direction toward the second impaction surface 18. The deflection can also be greater than 270°. The second impaction surface 18 is also the outer wall for guiding the reverse deflection, preferably the rear side of the wall of the incoming-flow-side acceleration section 12. The separation of particles from the fluid flow during the reverse deflection is thus increased. This is advantageous if the highest possible separation efficiency is to be achieved using the separating stage 100.

Figure 4:
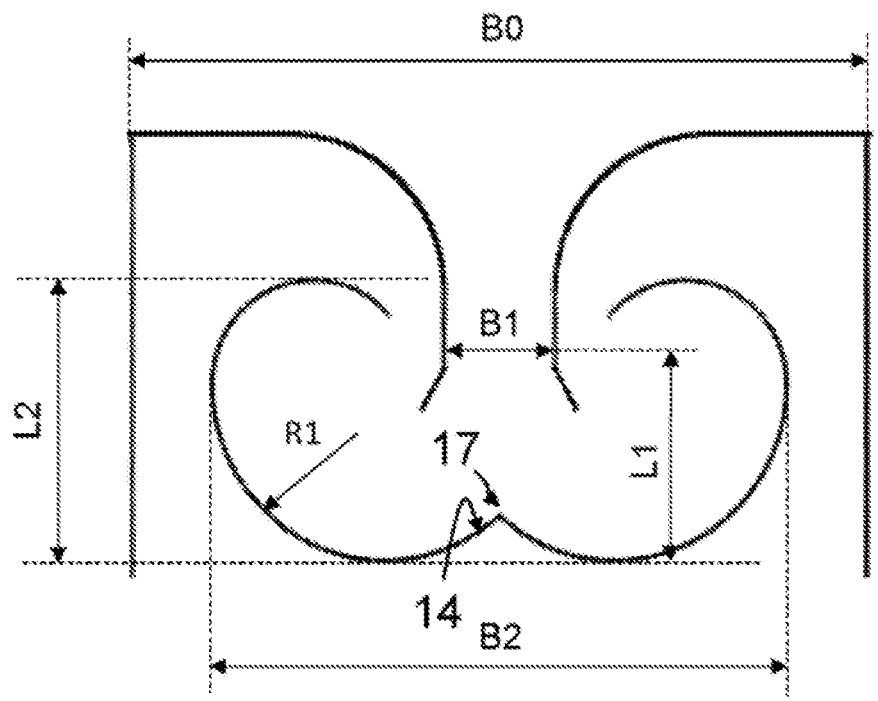
FIG. 4 shows a cross section of a further separating stage including a separating segment with explanation of various parameters.

FIG. 4 shows a cross section of a further separating stage 100 with an explanation of various parameters, in which the baffle region is concavely curved toward the end of the acceleration section. The distance L1 between the end having the smallest cross section of the acceleration section 12 and the curved baffle region of the first impaction surface is apparent. The region of the baffle region 14 opposite to the acceleration section 12 is pointed, so that a tip 17 of the baffle region 14 is directed against the flow.

Figure 5:
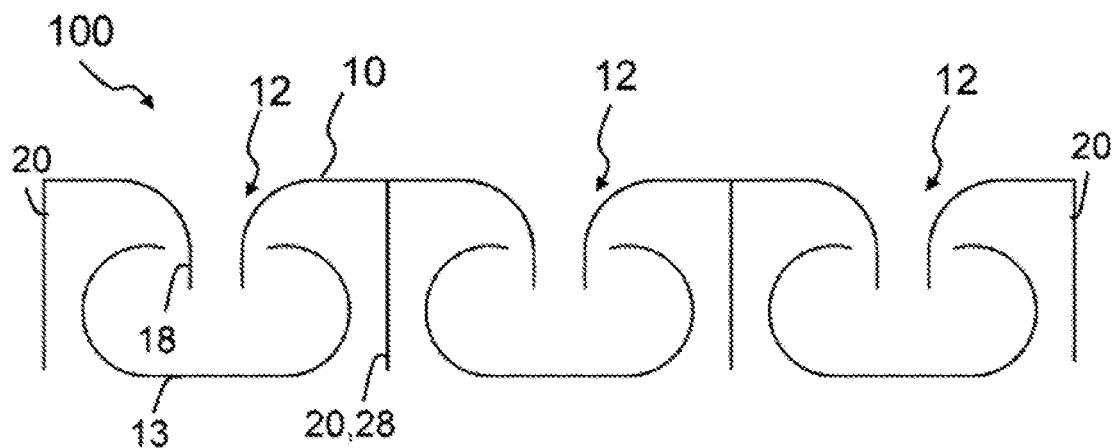
FIG. 5 shows a cross section through a separating stage having multiple adjacent separating segments which can have flow through them in parallel, having an incident flow surface according to FIG. 1 according to one exemplary embodiment of the invention.
Figure 6:
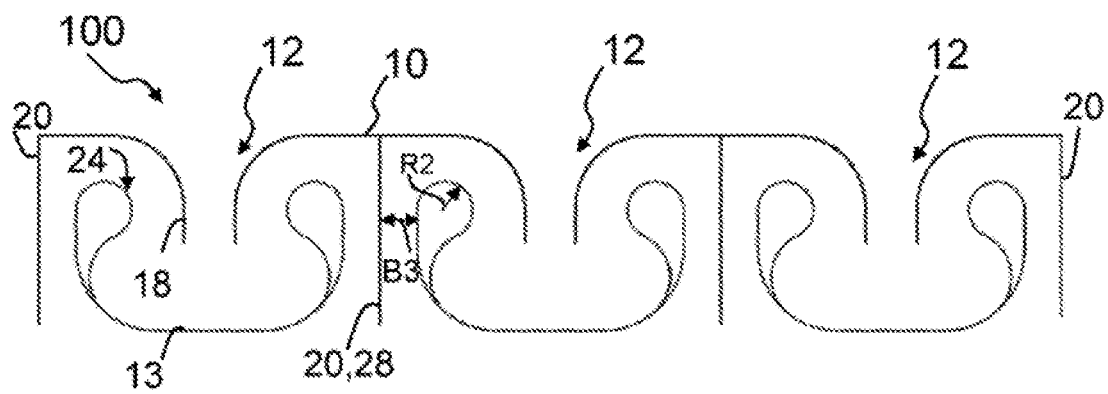
FIG. 6 shows across section through a separating stage having multiple adjacent separating segments which can have flow through them in parallel having rounded end edge of the curved portion according to a further exemplary embodiment of the invention.
Figure 7:
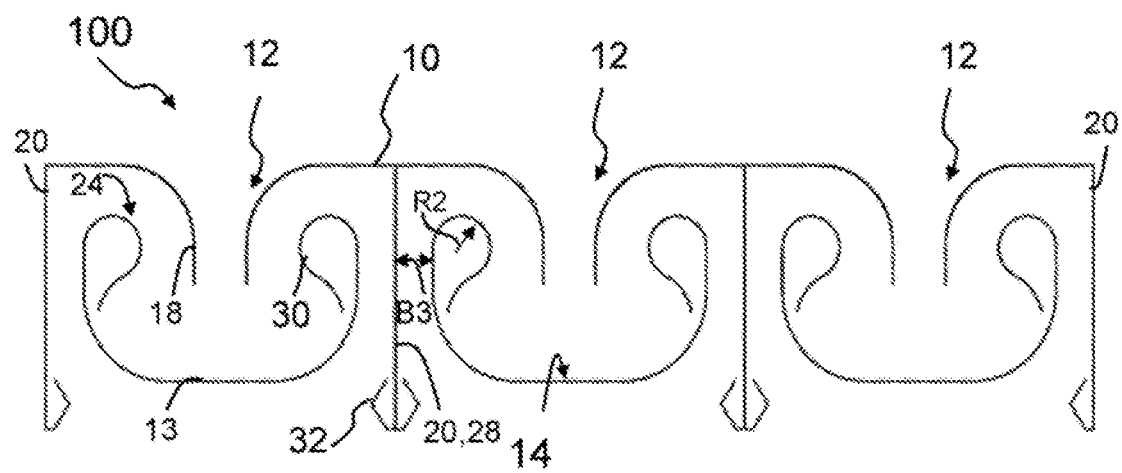
FIG. 7 shows across section through a separating stage having multiple adjacent separating segments which can have flow through them in parallel having collection pockets open toward the fluid flow according to a further exemplary embodiment of the invention.

FIGS. 5 to 7 show cross sections of separating stages 100 according to various exemplary embodiments of the invention, multiple respectively identical separating segments having acceleration sections 12 and first impaction services 13 are arranged adjacent to one another in the incident flow surface 10 and can have incident flow in parallel. The acceleration sections 12 are preferably arranged equidistant from one another. The individual acceleration sections 12 and impaction surfaces 13, 18 can essentially be designed like those in FIGS. 1 and 3, as can be seen in FIG. 5. Additionally or alternatively, they can be refined as in FIGS. 6 and 7. For a detailed description of the separating stage 100, reference is made to FIGS. 1 to 3.

FIG. 5 shows a cross section through a separating stage 100 according to one exemplary embodiment of the invention having three acceleration sections 12, which can have flow through them in parallel, in the incident flow surface 10 according to FIG. 1. The individual acceleration sections 12 and impaction surfaces 13 are separated from one another by partition walls 28, each of which corresponds to a boundary wall 20 of the separating stage 100 in FIGS. 1 and 3. The separating stage 100 has lateral boundary walls 22 on both sides parallel to the partition walls 28.

FIG. 6 shows a cross section through a separating stage 100 according to a further exemplary embodiment of the invention having acceleration sections 12, which can have flow through them in parallel, in the incident flow surface 10 and impaction surfaces 13 adjoining thereon each having rounded end edge 24 of the curved portion 15 of the first impaction surface 13. The rounded end edge 24 is, for example, teardrop-shaped in cross section and has at least one circular arc portion having an inner radius R2. Such a rounded end edge 24 of the curved portion 15 of the first impaction surface 13 is favorable for deflections of greater than 90°. The inner radius R2 is advantageously at least one-fourth of a width B3 of a free flow cross section in the flow channel between the rounded end edge 24 at the outlet-side end of the curved portion 15 of the first impaction surface 13 and the outside of the acceleration section 12 in order to reduce, in particular to minimize, the pressure loss. A particularly significant reduction of the pressure loss can be achieved if the inner radius R2 of the rounded end edge 24 is at least half the width B3 of the free flow cross section in the flow channel between the rounded end edge 24 and the outside of the acceleration section 12. B3 denotes the smallest flow cross section between the inner radius R2 and the second impaction surface 18 or boundary wall/partition wall 20, 28, depending on the specific position of the smallest flow cross section B3.

FIG. 7 shows a cross section through a separating stage 100 according to a further exemplary embodiment of the invention having three acceleration sections 12, which can have flow through them in parallel, in the incident flow surface 10, having collection niches 30 open towards the fluid flow at the end edge 24 of the first impaction surface 13 and a collection niche 32 at the outlet of the partition walls 28 between the acceleration sections 12 and impaction surfaces 13 and the boundary walls 20 on the outside of the separating stage 100. The inner radius of the collection niche 30 can be designed as in FIG. 6.

On overflowed inner radii R2 having rounded end edge 24 or in front of the relatively sharp-edged end edge 21 of overflowed walls, the collection niches 30, 32 open opposite to the overflow direction prevent particles already deposited on the wall surface from being entrained, in particular paint particles or agglomerates.

The separating stages 100 and separating units formed therefrom can be adapted for different applications, in particular defined by a required degree of separation, volume flow to be treated, and process conditions, by selecting individual separating stages 100 from an assortment of suitable separating stages and arranging them in suitable sequence in succession.

A required separation efficiency can be achieved with the lowest possible pressure loss via the separating unit 100. The highest possible storage capacity can also be achieved in order to achieve a long service life for the separating units. The separating unit 100 can have dimensions that are easy to handle and, particularly when loaded, can also have a weight that is still easy to handle.

Figure 8:
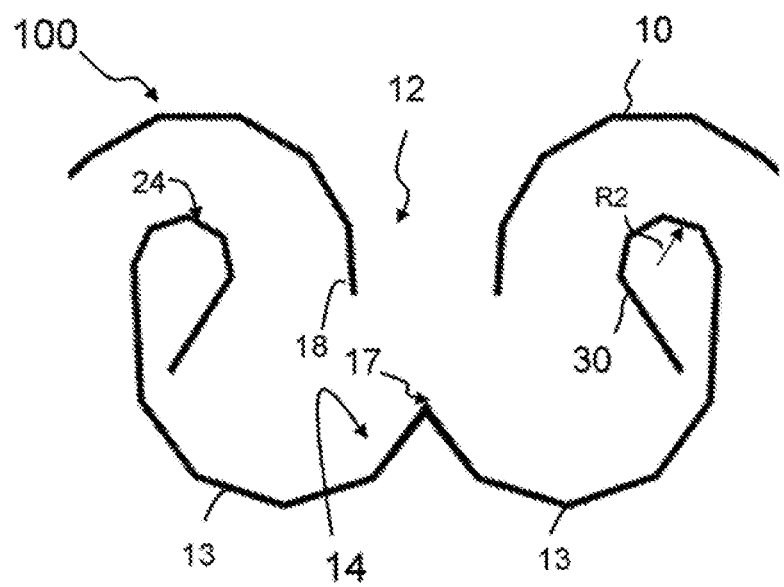
FIG. 8 shows a detail of a separating stage, shown without outer walls, according to one exemplary embodiment of the invention having fold lines.

FIG. 8 shows a detail of a separating stage 100, shown without outer walls according to one embodiment of the invention. The curvature of the curved regions is achieved by means of fold lines (not described in greater detail), so that straight surface segments extend in each case between the fold lines. Depending on the curvature, adjacent surface segments enclose a more or less small angle with one another. The region of the baffle region 14 opposite to the acceleration section 12 is pointed, so that a tip 17 of the baffle region 14 is directed against the flow.

Figure 9:
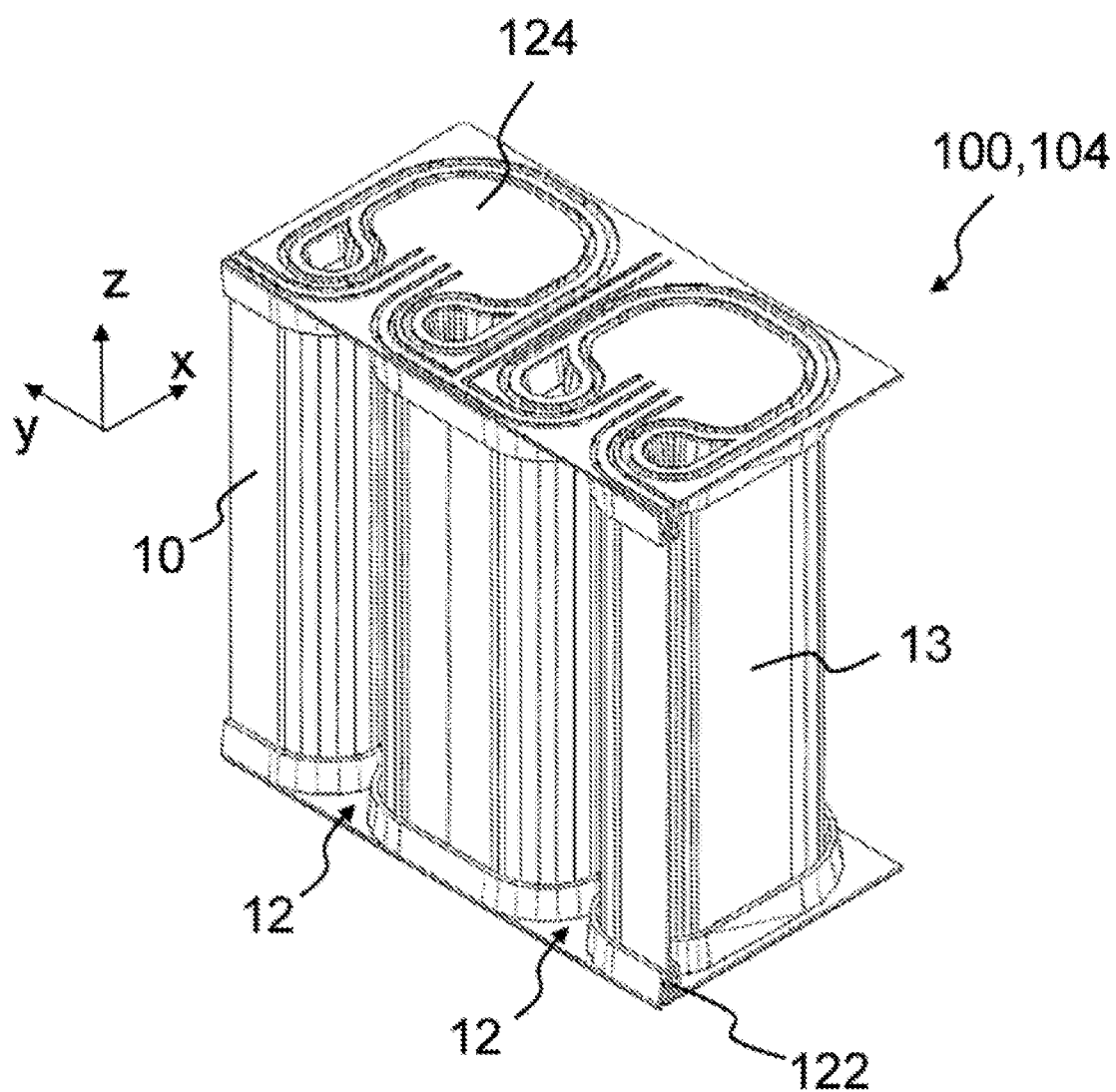
FIG. 9 shows an isometric view of a separating stage according to one exemplary embodiment of the invention.
Figure 10:
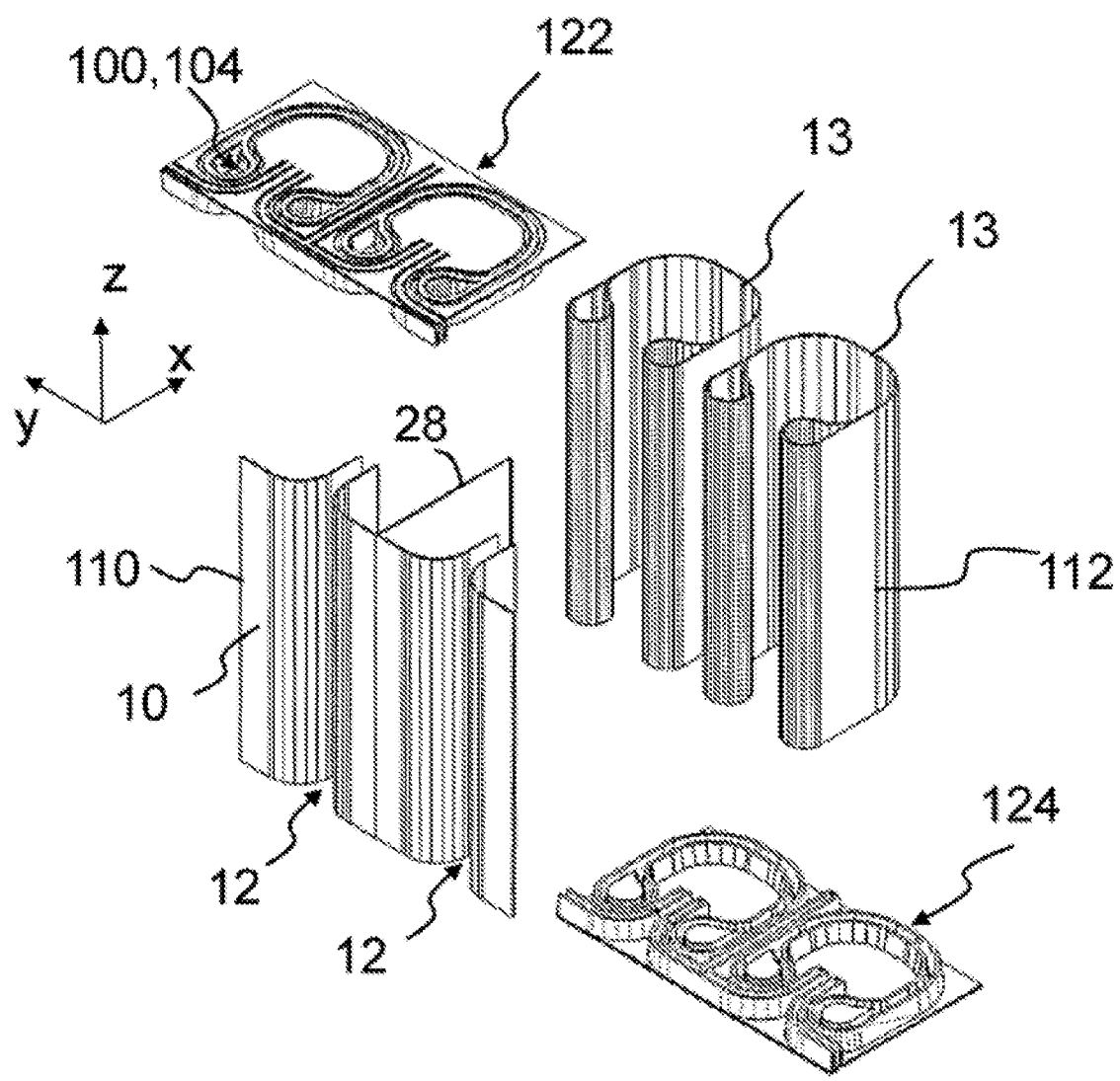
FIG. 10 shows an exploded view of the separating stage from FIG. 9.

FIG. 9 shows an isometric view of a separating stage 100 according to one exemplary embodiment of the invention, and FIG. 10 shows an exploded view of the separating stage 100 from FIG. 9.

For a respective separating segment of the first separating stage 100 of a separating unit, the ratio of the free inflow area, ie the narrowest cross section in the acceleration section 12, to the total cross-sectional area in front of the acceleration section 12 is in the range of 1:4 to 1:10. A ratio in the range of 1:6 to 1:8 has proven to be advantageous. The cross-sectional area is to be understood as the cross-sectional area of the respective separating segment of the separating stage 100 perpendicular to a main through-flow direction. The entire cross-sectional area of the separating segments is also referred to as the incident flow surface 10.

The separating stage 100 is constructed from a bottom part 122, a cover part 124, which is preferably of identical construction, and multiple components 110, 112, which are to form wall parts for the flow direction, namely the incident flow surface 10 having slotted acceleration sections 12 and first impaction surfaces 13. The component 110 also provides the second impaction surfaces 18 in the assembled state.

Bottom part 122 and cover part 124 have a negative contour, predetermined, for example, by depressions, holding nubs, and the like, in the form of the horizontal cross section of the separating stage 100 to have flow through it. The components 110, 112 are inserted into these negative contours.

Bottom part 122 and cover part 124 can be provided as a flat blank, for example, made of corrugated cardboard, having corresponding cutouts, or preferably as a three-dimensionally shaped component. Bottom part 122 and cover part 124 are particularly preferably provided as fiber molded parts or deep-drawn parts, in which the negative contour is designed in the form of depressions tapering downward and/or protrusions having trapezoidal cross-section, so that insertion bevels are available for easier insertion of the components 110, 112.

Figure 12:
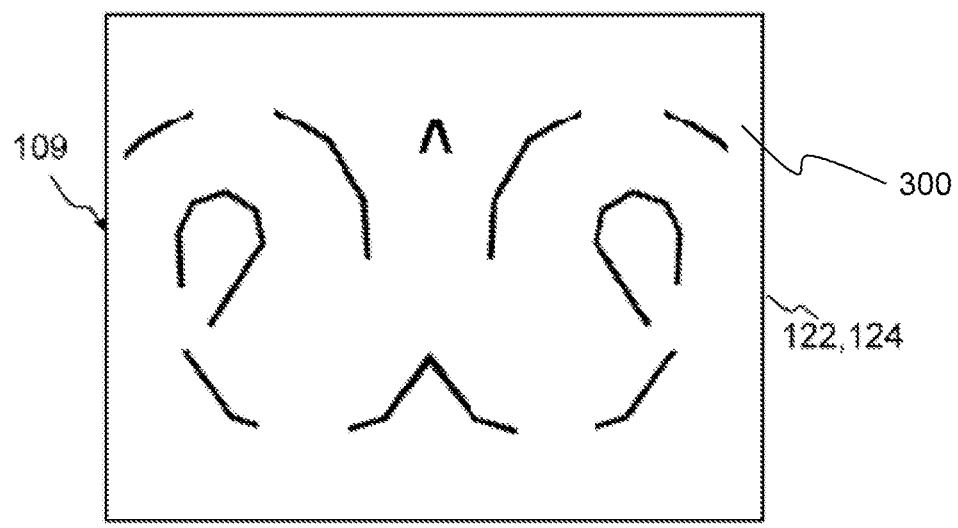
FIG. 12 shows a cover part or bottom part of a kit for producing a separating stage according to one exemplary embodiment of the invention.
Figure 13:
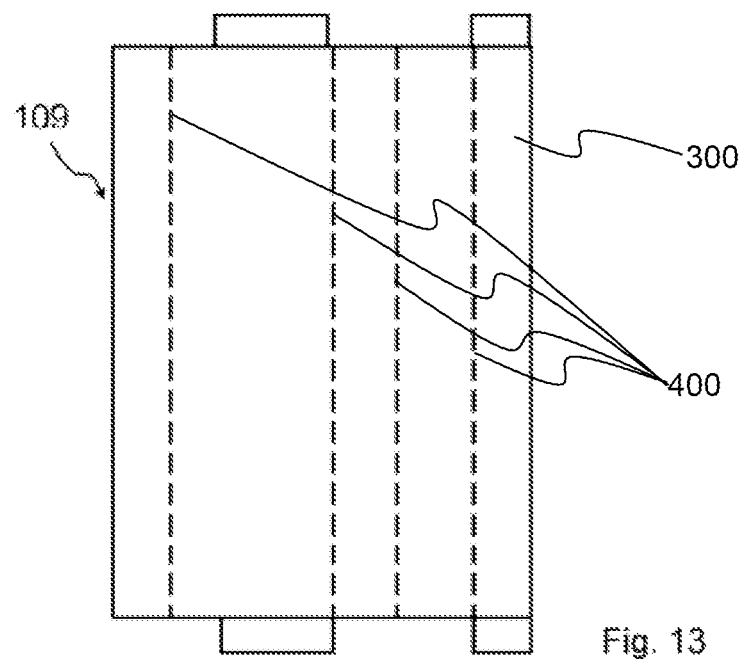
FIG. 13 shows a wall part of a kit for producing a separating stage according to one exemplary embodiment of the invention.
Figure 15:
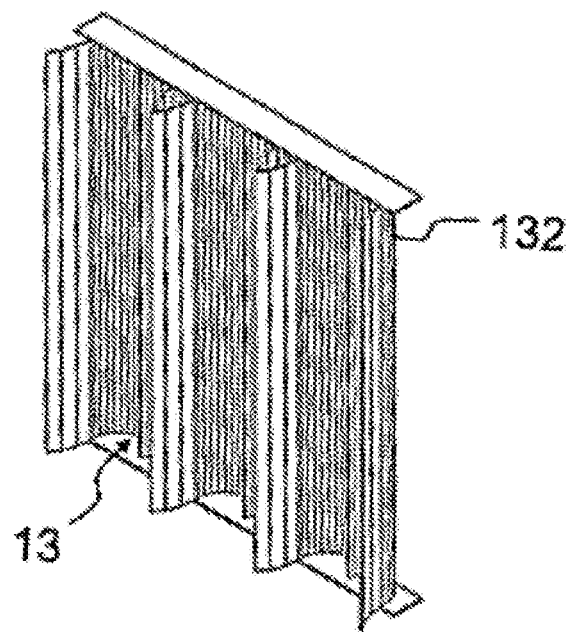
FIG. 15 shows a component for forming the first impaction surfaces of the separating stage according to FIG. 14 in the unfolded state.

The components 110, 112 of the wall parts preferably consist of or comprises flat blanks 300 as seen in FIGS. 12 and 13, for example, corrugated cardboard, or three-dimensionally shaped components 110, 112. If they are flat blanks, they are brought into the provided three-dimensional shape by folding or bending during the assembly of the separating stage 100. For this purpose, it is advantageous if the flat blanks 300 have corresponding perforations and/or fold lines 400 (FIG. 13) to facilitate proper formation of the provided structure.

This design is suitable for rather coarse separating structures, which offer moderate separation efficiency and a very high storage volume with low pressure loss. Therefore, this separating stage 100 is primarily intended as a first separating stage 102 for coarse separation. Depending on the process, in particular depending on the paint, however, it can also be sufficient as the only separating stage 100. In CFD simulations and tests of such separating stages 100, a separation efficiency in the range of 60% to 96% could be achieved with differential pressures of the unloaded separating stage 100 between 100 Pa and 300 Pa.

Figure 11:
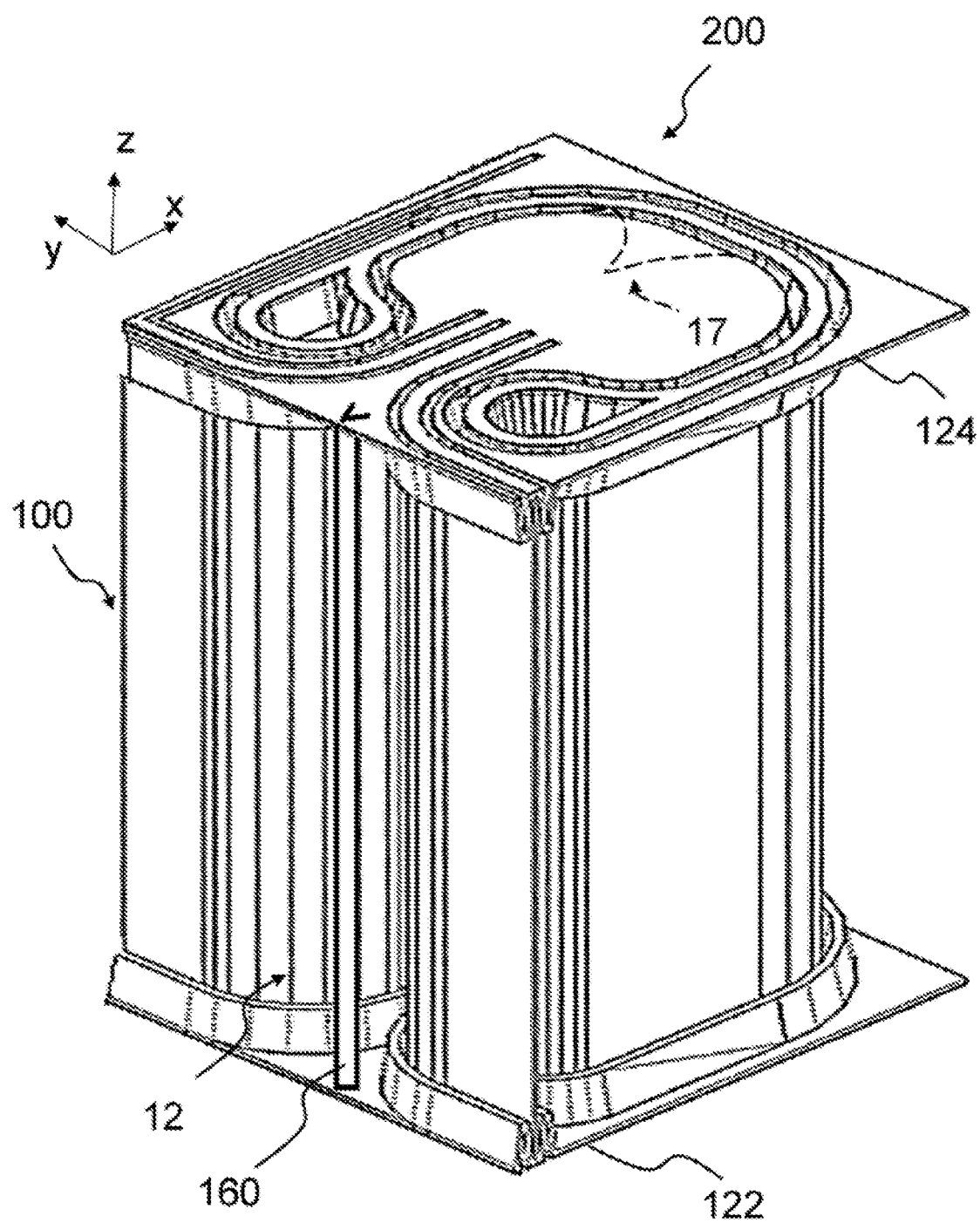
FIG. 11 shows an isometric view of a separating stage according to one exemplary embodiment of the invention having a guide element in front of the free flow cross section of the acceleration section.

FIG. 11 shows an isometric view of a separating stage 100 of a separating unit 200 according to one exemplary embodiment of the invention having a guide element 160 in front of the free flow cross section of the acceleration section 12. In this exemplary embodiment, the separating stage 100 comprises, by way of example, only a single separating segment.

The guide element 160 extends in a plane of symmetry of the free flow cross section at the entry of the fluid into the acceleration section 12 from the bottom part 122 to the cover part 124 along the z-axis. In this example, the guide element 160 has an extension which is parallel to the z-axis.

In this example, the guide element 160 is formed tapering to a point against the direction of flow, for example having a V-shaped cross section. The guide element 160 can be used to minimize noise during the flow through the separating unit 200.

The guide element 160 can be provided detachably from the separating unit 200 and can be removed from the separating unit 200 if necessary.

The guide element 160 can influence the through flow in such a way that a noise development can be reduced or substantially suppressed.

By way of suitable positioning and/or shaping of the guide element 160, it can induce swirling of the inflowing fluid, for example, inflowing air, and/or a reflection of the sound generated after the acceleration section 12.

In an alternative example, the cross section of the region of the baffle region 14 opposite to the acceleration section 12 can be pointed (see, for example, FIGS. 4 and 8), so that a tip 17 of the baffle region 14 is directed against the flow. This is indicated in the figure by an interrupted line on the cover part 124.

The guide element 160 can be provided as a one-piece additional element, which can be added or left out if needed during the construction of the separating unit 106.

FIG. 12 shows a bottom part 122 or cover part 124 of a kit 109 for producing a separating stage according to one exemplary embodiment of the invention. FIG. 13 shows a wall part of the kit 109 for producing the separating stage. The negative contour of the separating stage is formed as a sequence of perforated openings in the bottom part 122 or cover part 124, which emulates the shape of the wall elements of the separating stage.

The wall part shown can be brought into its shape by curving or buckling and inserted with its tabs on its narrow sides into the openings of the negative contour.

An advantageous method for producing a separating stage 100 are separating unit 200 having at least one separating stage 100 according to the invention provides that the kit 109 is provided from components.

The components are in particular blanks made of cardboard and/or corrugated cardboard and/or fiber molded parts and/or deep-drawn parts made of plastic.

Components are taken from the kit and shaped to form at least one incident flow surface, at least one acceleration section, and at least one impaction surface.

The shaped components are inserted into a corresponding negative form of bottom part 122 and/or cover part 124. The assembly made up of the at least one incident flow surface, the at least one acceleration section, and the at least one impaction surface having bottom part 122 and cover part 124 is inserted into a housing.

At least one filter stage, in particular a depth filter, can optionally be inserted into the housing downstream of the at least one separating stage in the through-flow direction.

Figure 14:
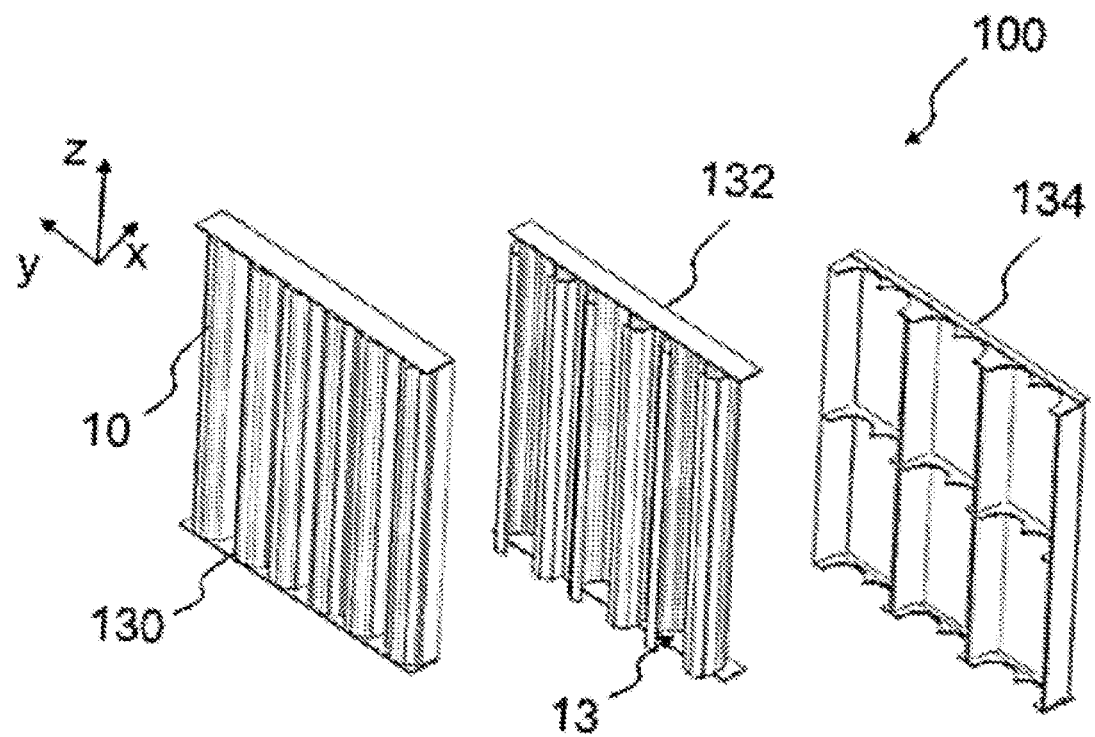
FIG. 14 shows an exploded view of individual components of a separating stage having three separating segments according to one exemplary embodiment of the invention.
Figure 17:
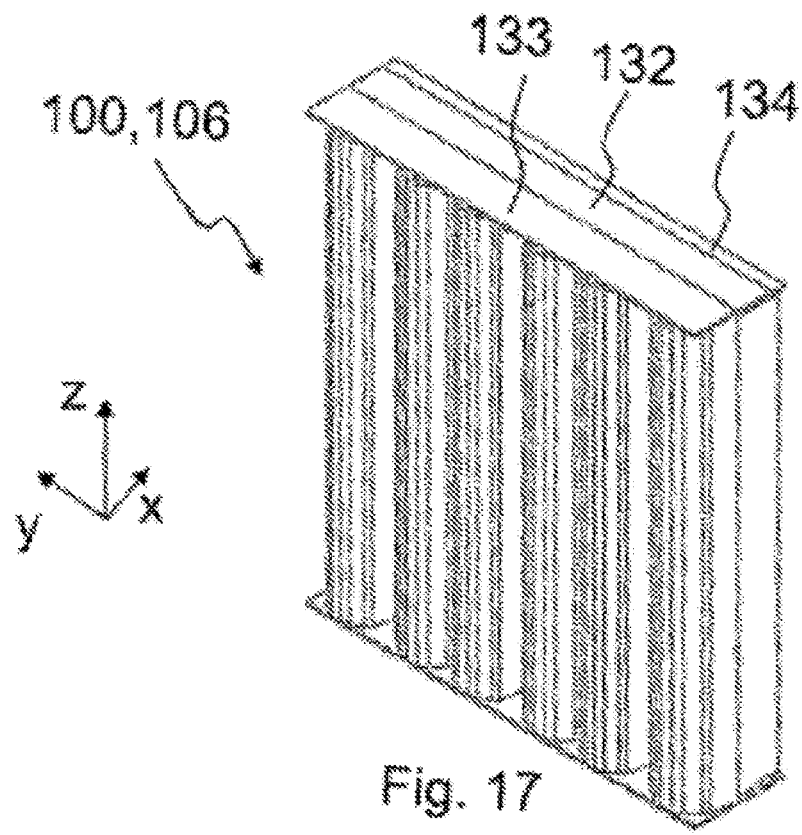
FIG. 17 shows the separating stage according to FIG. 14 in assembled form in an isometric illustration.
Figure 16:
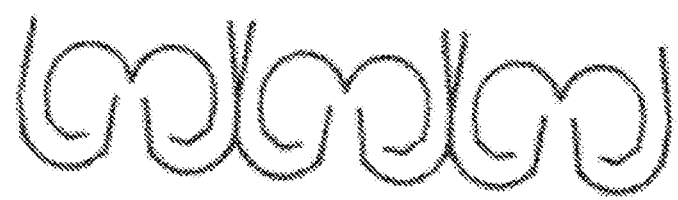
FIG. 16 shows a cross section of the separating stage according to FIG. 14.

FIGS. 14 to 17 show a further exemplary embodiment of the invention. FIG. 14 shows an exploded view of individual components 130, 132, 134 of a kit 109 for a separating stage 100, wherein a component 132 for first impaction surfaces 13 is shown both in folded form and also additionally, in FIG. 15, in unfolded form. FIG. 16 shows a cross section of the separating stage 100 according to FIG. 14 and FIG. 17 shows the separating stage 100 according to FIG. 14 in assembled form. In contrast to the preceding exemplary embodiment, the components 130, 132, 134 have flat end strips frontally at the top and bottom, which hold together the individual elements of the respective component 130, 132, 134.

The separating stage 100 is constructed from one or more, three-dimensionally shaped components 130, 132, 134 formed as sheets and forms a relatively fine separating stage 106. The sheets are three-dimensionally shaped, but free of undercuts.

The separating structure can be produced by arranging multiple components 130, 132, 134 in succession or by folding one or more such components 130, 132, 134 or by a combination of folding and arranging these components 130, 132, 134 in succession.

The components 130, 132, 134 formed as sheets are preferably fiber molded parts or deep-drawn parts. The component 130 contains the incident flow surface 10 and accelerator sections 12 as well as partition walls between the acceleration sections 12, the component 132 contains the first impaction surfaces 13, and the component 134 contains a support structure for the component 132.

This design of the separating stage 106 is suitable for rather fine separating structures having increased separation efficiency and less storage volume.

For this purpose, the geometric structure of the separating stage 100 comprises a plurality of acceleration sections 12, which are arranged in parallel and are designed as incoming flow nozzles, having first impaction surfaces 13 which are arranged relatively close behind and have comparatively small radii of curvature. In CFD simulations of such separating stages 100, the separation efficiency at differential pressures between 300 Pa and 400 Pa over the unloaded separating stage was in the range from 93 to 99%.

A set of components 130, 132, 134 can be designed such that several different separating stages 100 can alternatively be produced therefrom. The components 130, 132, 134 are preferably blanks made of cardboard or corrugated cardboard and/or fiber molded parts and/or deep-drawn parts made of plastic. Due to the production process, fiber molded parts or deep-drawn parts are formed without undercuts and therefore can be stacked well. All components can therefore be transported in a space-saving manner.

Figure 19:
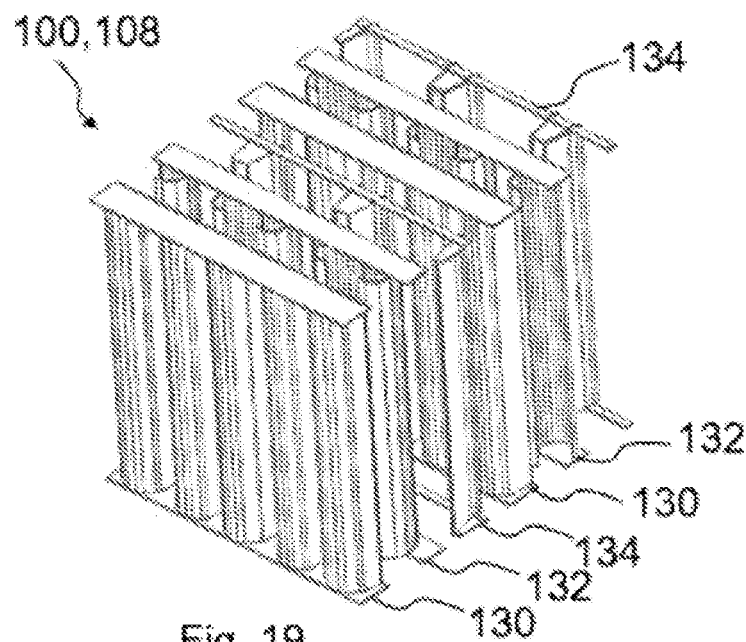
FIG. 19 shows an exploded view of the separating stage from FIG. 18.
Figure 18:
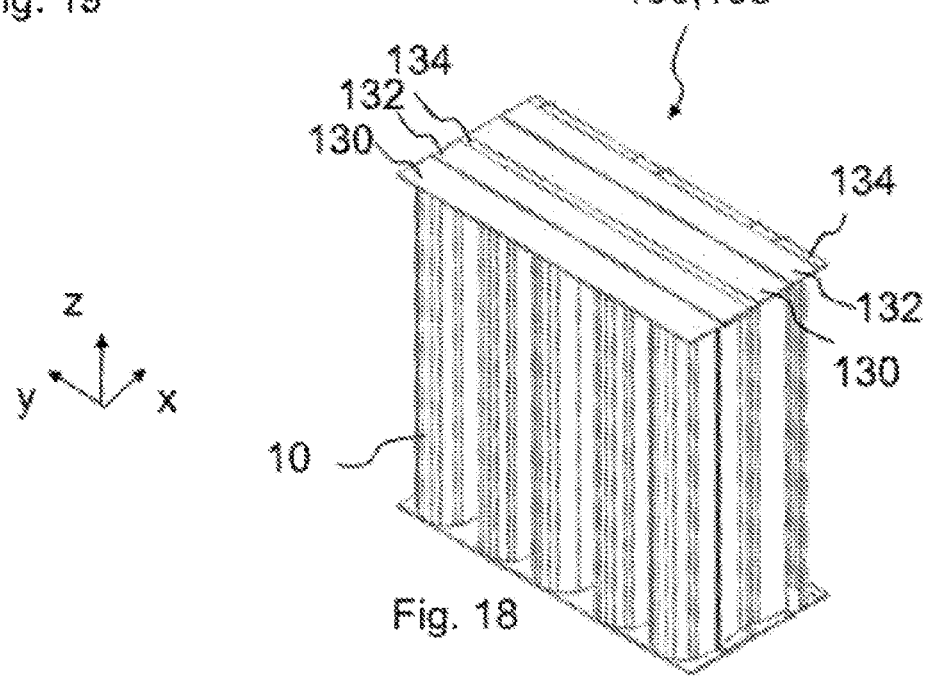
FIG. 18 shows an isometric illustration of a separating stage according to one exemplary embodiment of the invention having separating segments arranged offset in the depth and having incident flow in parallel.
Figure 20:
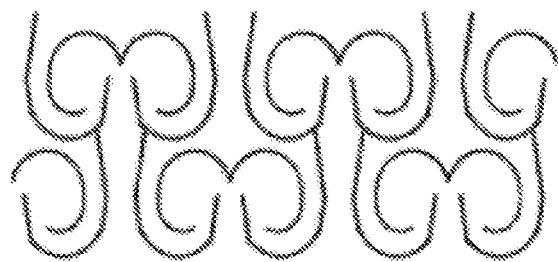
FIG. 20 shows a cross-section of the separating stage according to FIG. 18.

FIGS. 18 to 20 show a further exemplary embodiment of the invention. FIG. 18 shows a separating stage 100 according to an exemplary embodiment of the invention having two separating stages arranged fluidically in parallel but in succession. FIG. 19 shows an exploded view of the separating stage 100 from FIG. 18. FIG. 20 shows a cross section of the separating stage 100 according to FIG. 18;

The separating stage 100 is distinguished in that impaction surfaces having incident flow due to parallel acceleration sections 12 designed as incoming flow nozzles are arranged spatially in succession. To represent the structures arranged in succession, multiple identical components 130, 132, 134 are used here, which only have to be used rotated by 180° around the x-axis, the longitudinal axis here, for the rear part of the structure. The components 130, 132, 134 are preferably fiber molded parts.

Figure 21:
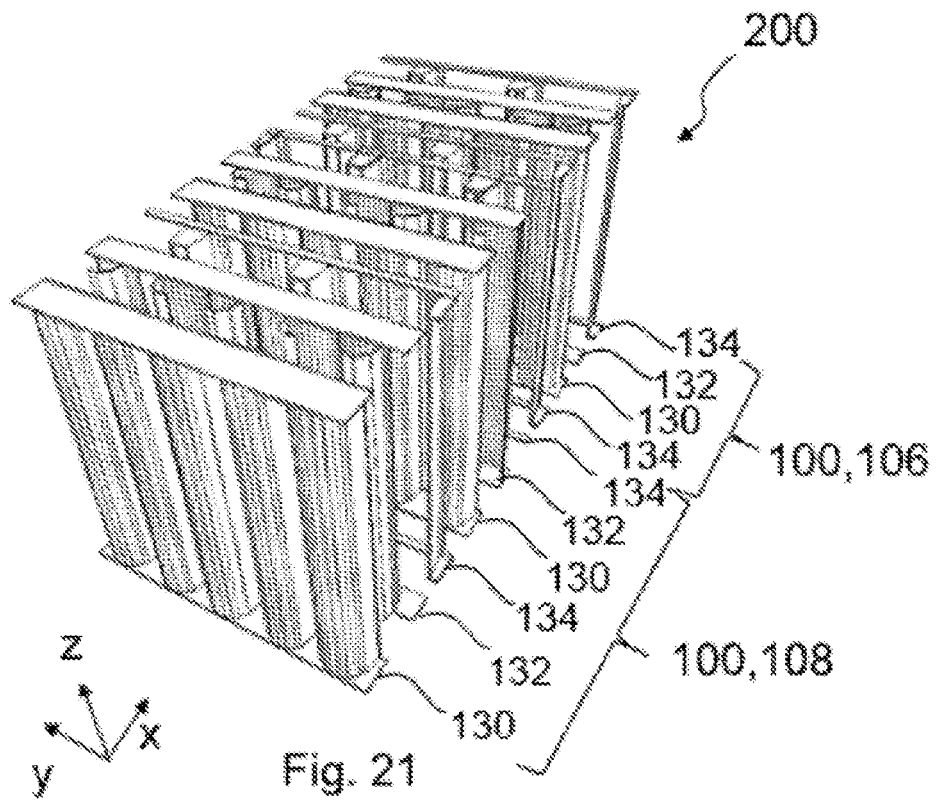
FIG. 21 shows an exploded view of a separating unit according to one exemplary embodiment of the invention having three separating stages connected in series with two coarse separating stages and one fine separating stage.
Figure 22:
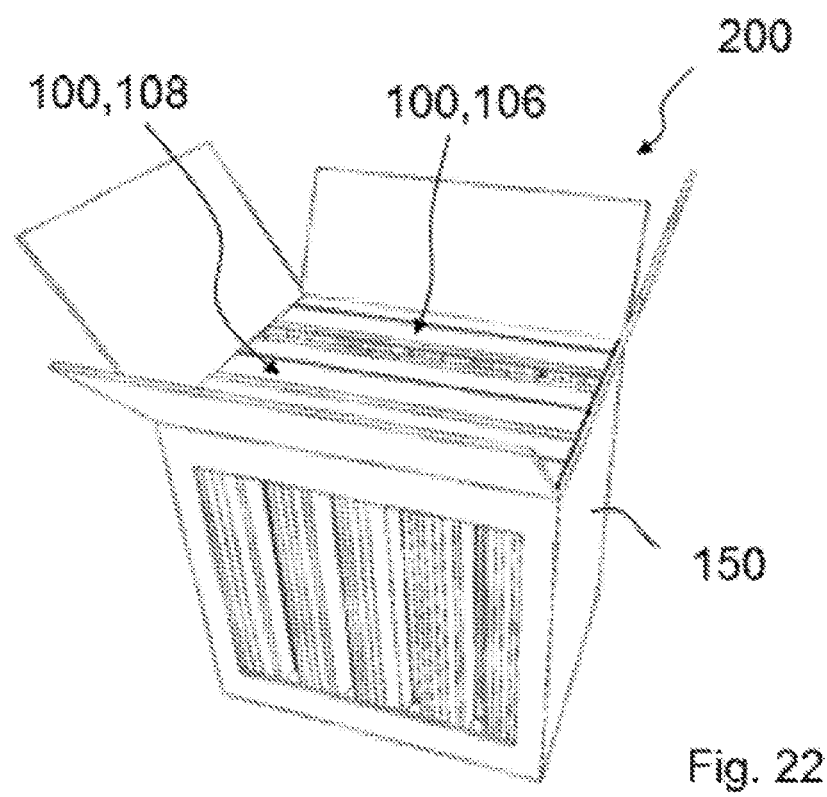
FIG. 22 shows the separating unit according to FIG. 21 in a housing in an isometric illustration.
Figure 23:
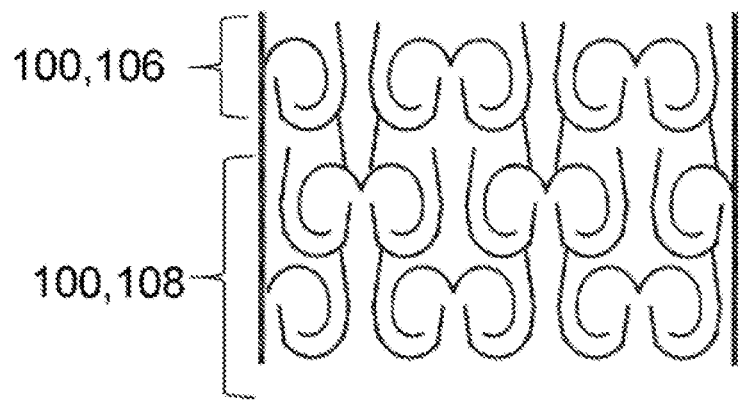
FIG. 23 shows across section of the separating stages of the separating unit according to FIG. 22.

FIGS. 21 to 23 show an exemplary embodiment of a separating unit 200 according to the invention. FIG. 21 shows an exploded view of the separating unit 200 having a separating stage 108 as in FIGS. 18 to 20 and a single fine separating stage 106 connected in series thereto. FIG. 22 shows the separating unit 200 according to FIG. 21 inserted into a housing 150 and FIG. 23 shows a cross section of the separating stages 108, 106 of the separating unit 200 according to FIG. 22. According to one advantageous design of the separating unit, the housing can have an opening having an upper edge 152 (FIG. 25) and a lower edge 154 (FIG. 25) on its incident flow side 10, wherein the edges are formed having different heights. A favorable height of the lower edge 154 of the housing is at least 1.5 times, preferably twice as large as a height of the opposing upper edge of the housing. With dimensions of the housing having edge lengths of approximately 500 mm, a height of the upper edge 152 between 20 mm and 40 mm is favorable and a height of the lower edge 154 between 40 mm and 100 mm, preferably between 50 mm and 80 mm.

In the first separating stage 100, 108, the incoming flow takes place through six acceleration sections 12 having flow through them in parallel in the first component 130 and the first impaction surfaces 13 (component 132) behind them are arranged offset in succession. The second separating stage 100, 106 consists of or comprises geometrically identical contours, but only has three acceleration structures 12 which have flow through them in the component 130 in the rear region of the exploded view. The first and second separating stages 108, 106 are constructed from a total of 10 components 130, 132, 134: However, it is advantageous that only three different components 130, 132, 134 are used for this purpose. The second separating stage 106 has a higher separation efficiency since it has flow through it at twice the flow velocities as the first separating stage 106. Both separating stages 108, 106 are arranged in a common outer box as housing 150.

Figure 24:
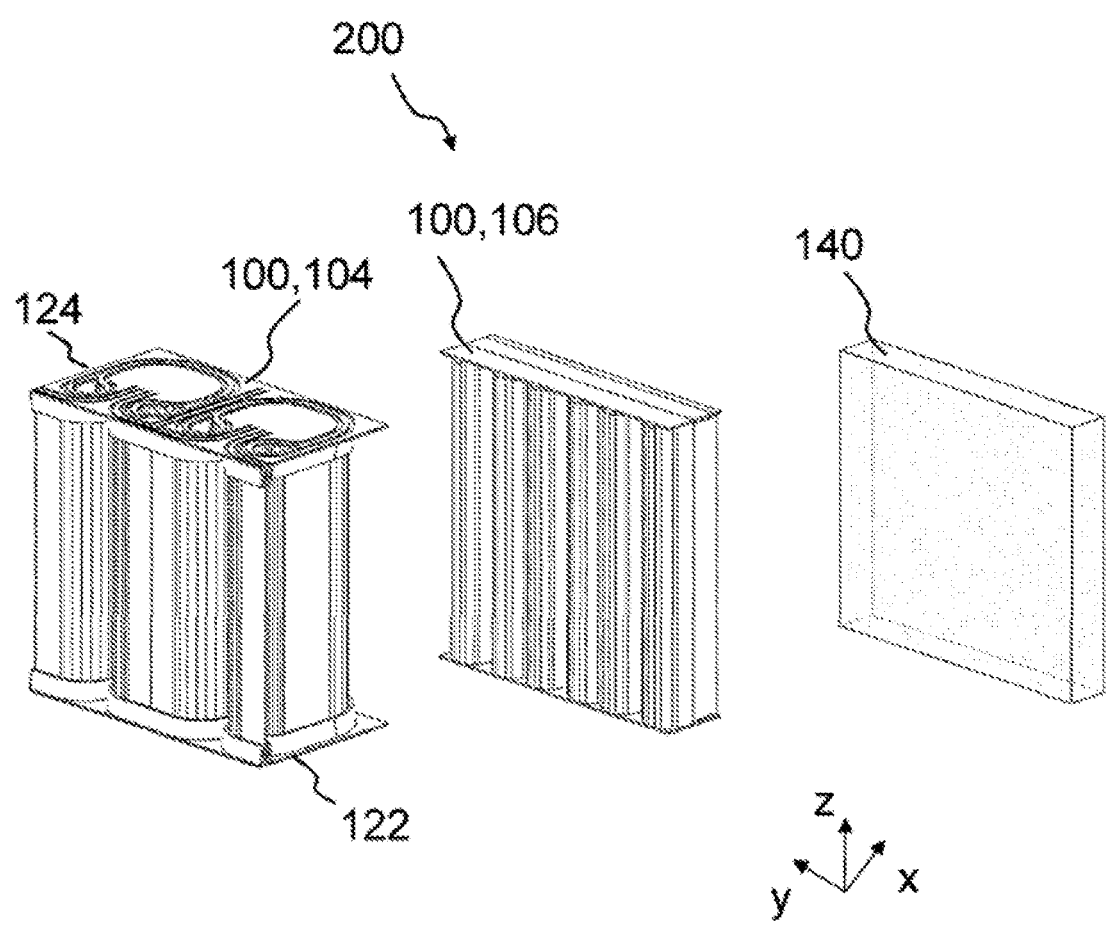
FIG. 24 shows an exploded view of a separating unit having two separating stages and one downstream filter stage in the form of a depth filter according to one exemplary embodiment of the invention.
Figure 25:
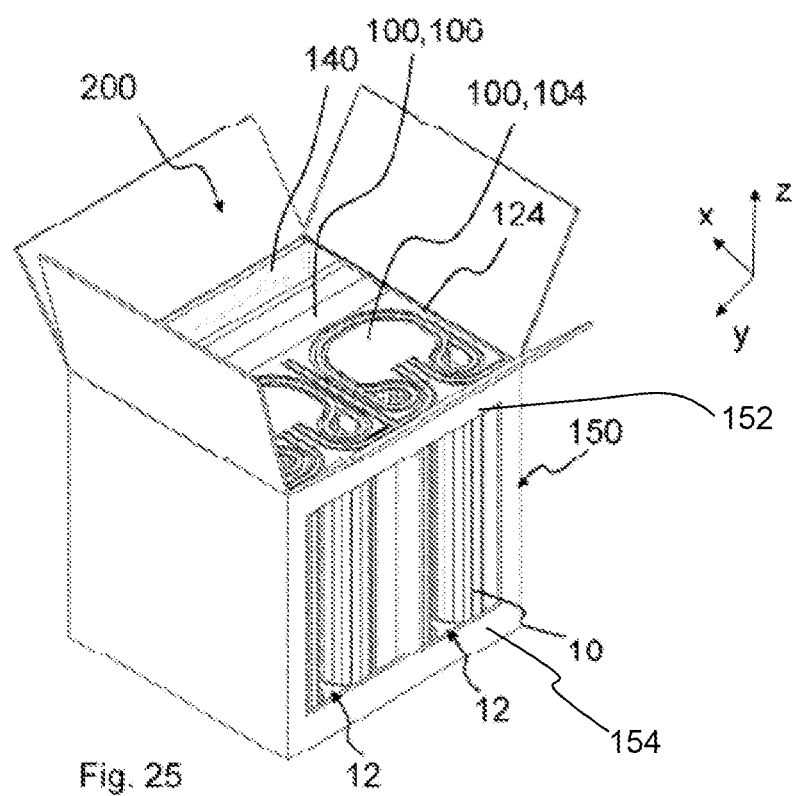
FIG. 25 shows an isometric illustration of the separating unit from FIG. 24 in a housing.
Figure 26:
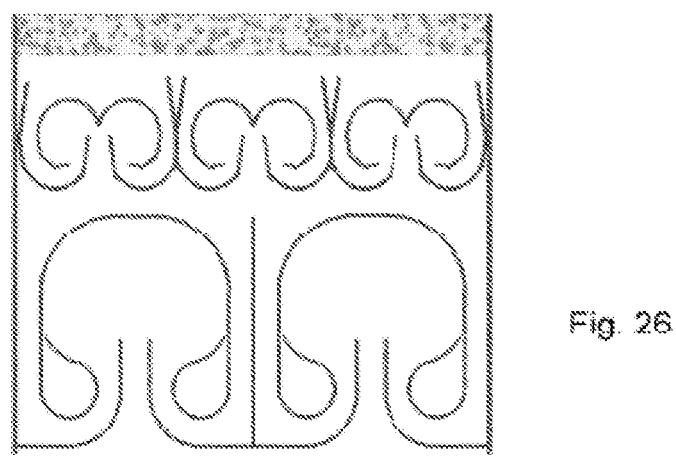
FIG. 26 shows a cross section of the separating unit according to FIG. 24.

FIGS. 24 to 26 show a further exemplary embodiment of a separating unit 200 having multiple separating stages 100. FIG. 24 shows an exploded view of a coarse separating stage 104, a fine separating stage 106, and a depth filter 140 according to an exemplary embodiment of the invention. FIG. 25 shows the separating unit 200 from FIG. 24 in an isometric illustration. FIG. 26 shows a cross section of the separating unit 200 according to FIG. 25.

The separating unit 200 is constructed from two separating stages 104, 106 and a post-filter stage in the form of a depth filter 140. The first separating stage 104 is constructed in accordance with the exemplary embodiment in FIGS. 9 to 10 and is used as a low-pressure-loss coarse separator. The second separating stage 106 is constructed in accordance with the exemplary embodiment in FIGS. 14 to 17 and is used as a fine separator having increased efficiency. A layer of filter material as depth filter 140 follows as a post-filter stage, for example a commercially available 100 mm thick glass fiber paint mist separating mat or the like.

Both separating stages 104, 106 and depth filter 140 are arranged in a common outer box as housing 150

In general, separating units 200 are preferred in the exemplary embodiments, the external dimensions of which do not exceed width×height×depth (corresponds to the edge length measured in the flow direction 102 (FIG. 1))=500× 500×700 mm.

The filter stage 140 in the form of a depth filter can advantageously have a folded filter bellows 142.

The separating unit 200 is provided for treating an air volume flow of 500 m³/h to 2000 m³/h, in particular 1300 m³/h to 1800 m³/h.

At an incident flow velocity of the separating unit 200 (with respect to the total cross-sectional area) of 1.6 m/s, the pressure loss for the through flow of the unloaded separating unit is in the range of 200 Pa to 800 Pa, preferably at most 600 Pa.

Figure 27:
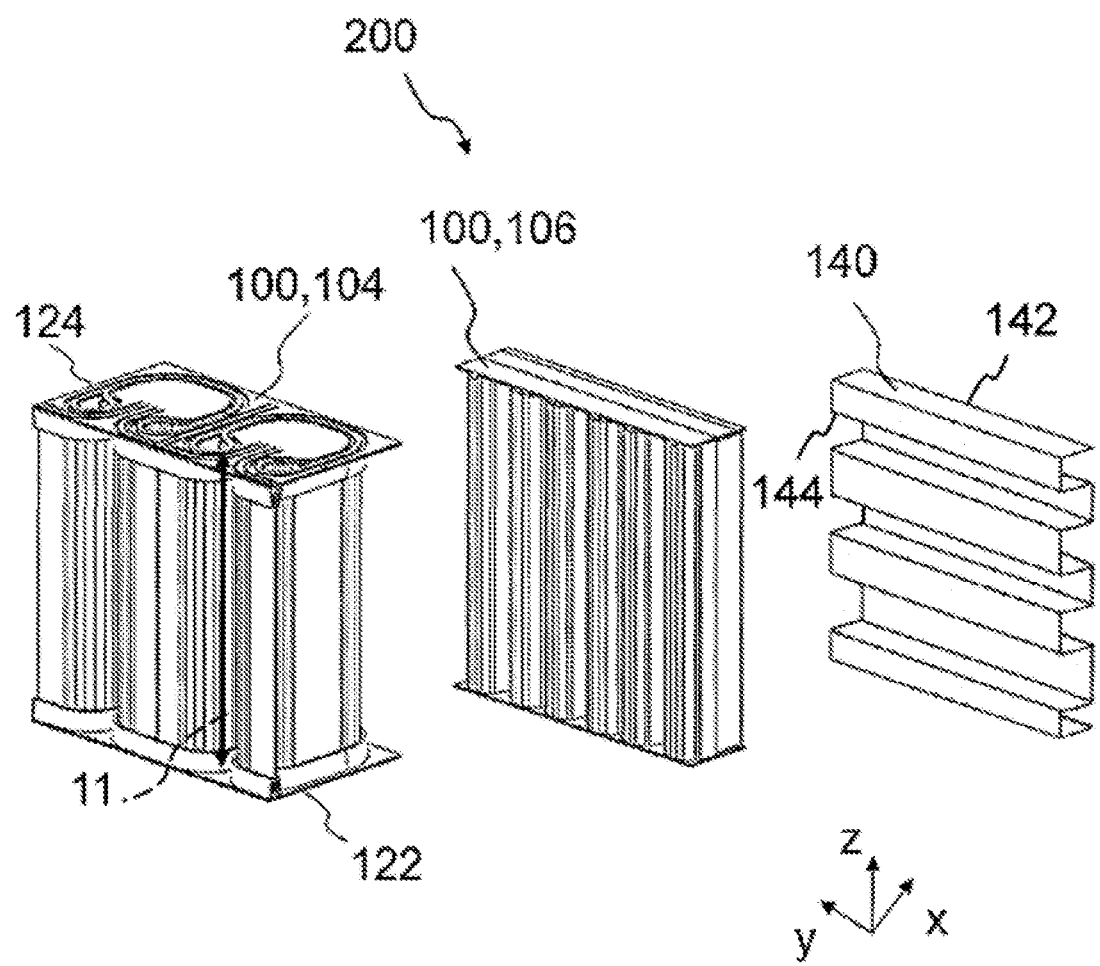
FIG. 27 shows an exploded view of a separating unit having two separating stages and a downstream filter stage in the form of a depth filter having folded filter bellows, the fold edges of which are oriented transversely to a z-axis of the separating stages, according to one exemplary embodiment of the invention.

FIG. 27 shows a further exemplary embodiment of the invention in an exploded view having a separating unit 200 having two separating stages 100, namely a coarse separating stage 104 having two acceleration sections which can have flow through them in parallel and are not described in greater detail and a fine separating stage 106 having three acceleration sections which can have flow through them in parallel and are not described in greater detail, and a downstream filter stage 140 in the form of a depth filter.

The filter stage 140 has a folded filter bellows 142, the fold edges 144 of which are oriented in the direction of the y-axis and thus transversely to the extension 11 of the acceleration sections extending in the direction of the z-axis and which extend in the direction of the z-axis. This allows the fluid that emerges from the second separating stage 106 to flow through the filter stage 140 evenly. If the separating unit 200 were tilted around the x-axis, for example, it is advantageous to maintain the relative orientation of the fold edges 144 of the filter stage 140 transverse to the extension 11 of the acceleration section 12.

The filter edges 144 are angular in this example. Optionally, the filter edges 144 can also be designed differently, for example V-shaped or U-shaped.

Figure 28:
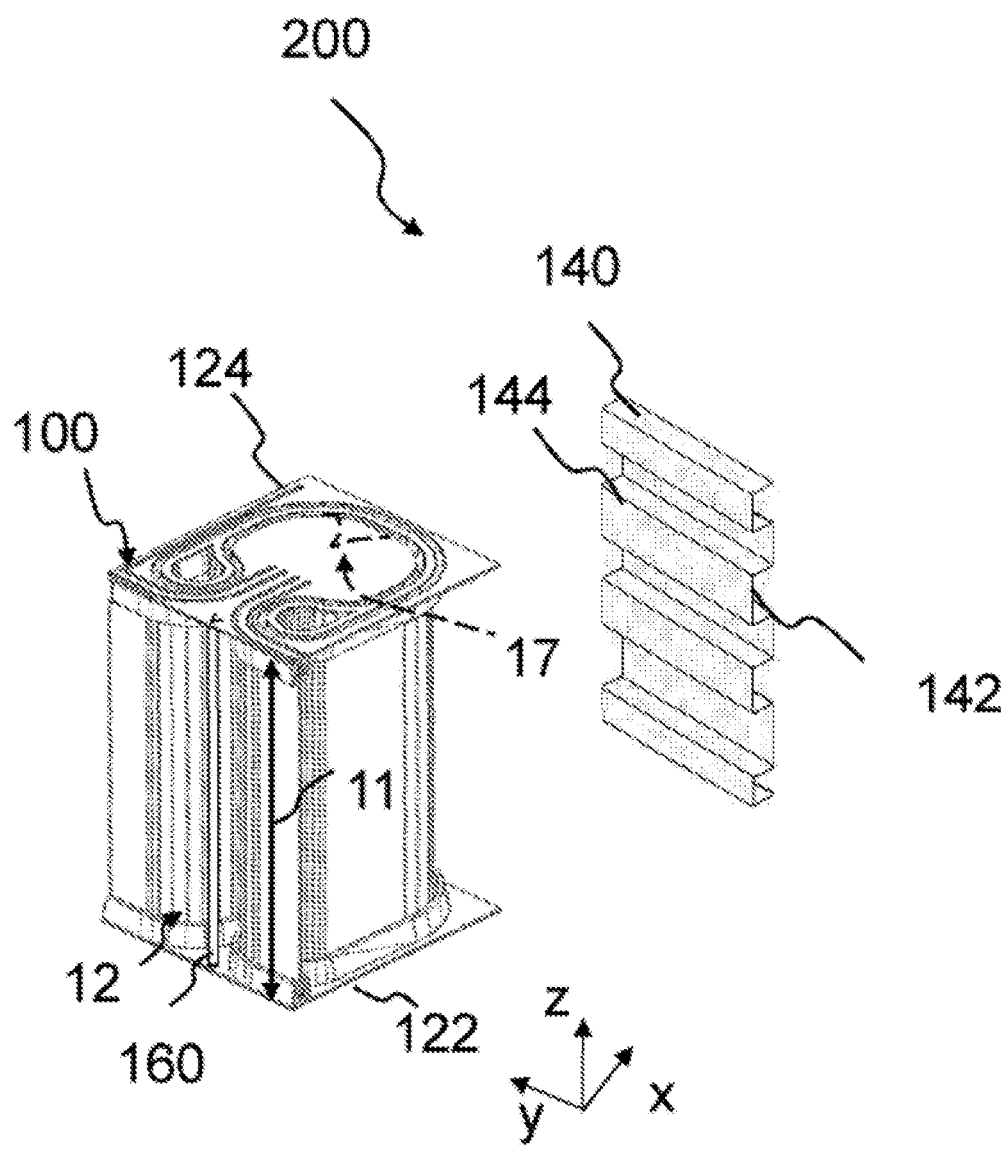
FIG. 28 shows an exploded view of a separating unit having a separating stages and a downstream filter stage in the form of a depth filter having folded filter bellows, the fold edges of which are oriented transversely to a z-axis of the separating stage, according to one exemplary embodiment of the invention.

FIG. 28 shows a further exemplary embodiment of the invention in an exploded view. A separating unit 200 comprises a single separating stage 100 here.

In this exemplary embodiment, the separating stage 100 comprises, for example, only a single separating segment. The separating stage 100 furthermore has a guide element 160 in front of the free flow cross section at the entry of the fluid into the acceleration section.

The filter stage 140 has a folded filter bellows 142, the fold edges 144 of which are oriented in the direction of the y-axis and thus transversely to the extension 11 of the acceleration section extending in the direction of the z-axis. If the separating unit 200 were tilted around the x-axis, for example, it is advantageous to maintain the relative orientation of the fold edges 144 of the filter stage 140 transverse to the extension 11 of the acceleration section 12.

The guide element 160 extends in a plane of symmetry of the free flow cross section at the entry of the fluid into the acceleration section from the bottom part 122 to the cover pan 124 along the vertical axis z. The guide element 160 has an extension in this example which is parallel to the z-axis.

In this example, the guide element 160 is formed tapering to a point against the direction of flow, for example having a V-shaped cross section. The guide element 160 can be used to minimize noise during the flow through the separating unit 200.

The guide element 160 can be provided detachably from the separating unit 200 and can be removed from the separating unit 200 if necessary.

The guide element 160 can influence the through flow in such a way that a noise development can be reduced or substantially suppressed.

By way of suitable positioning and/or shaping of the guide element 160, it can induce swirling of the inflowing fluid, for example, inflowing air, and/or a reflection of the sound generated after the acceleration section 12.

In an alternative example, the cross section of the region of the baffle region 14 opposite to the acceleration section 12 can be pointed (see, for example, FIGS. 4 and 8), so that a tip 17 of the baffle region 14 is directed against the flow. This is indicated in the figure by an interrupted line on the cover part 124.

The guide element 160 can be provided as a one-piece additional element, which can be added or left out if needed during the construction of the separating unit 106.

The two stages 100, 140 can optionally be arranged in a single housing or in two separate housings.

Figure 29:
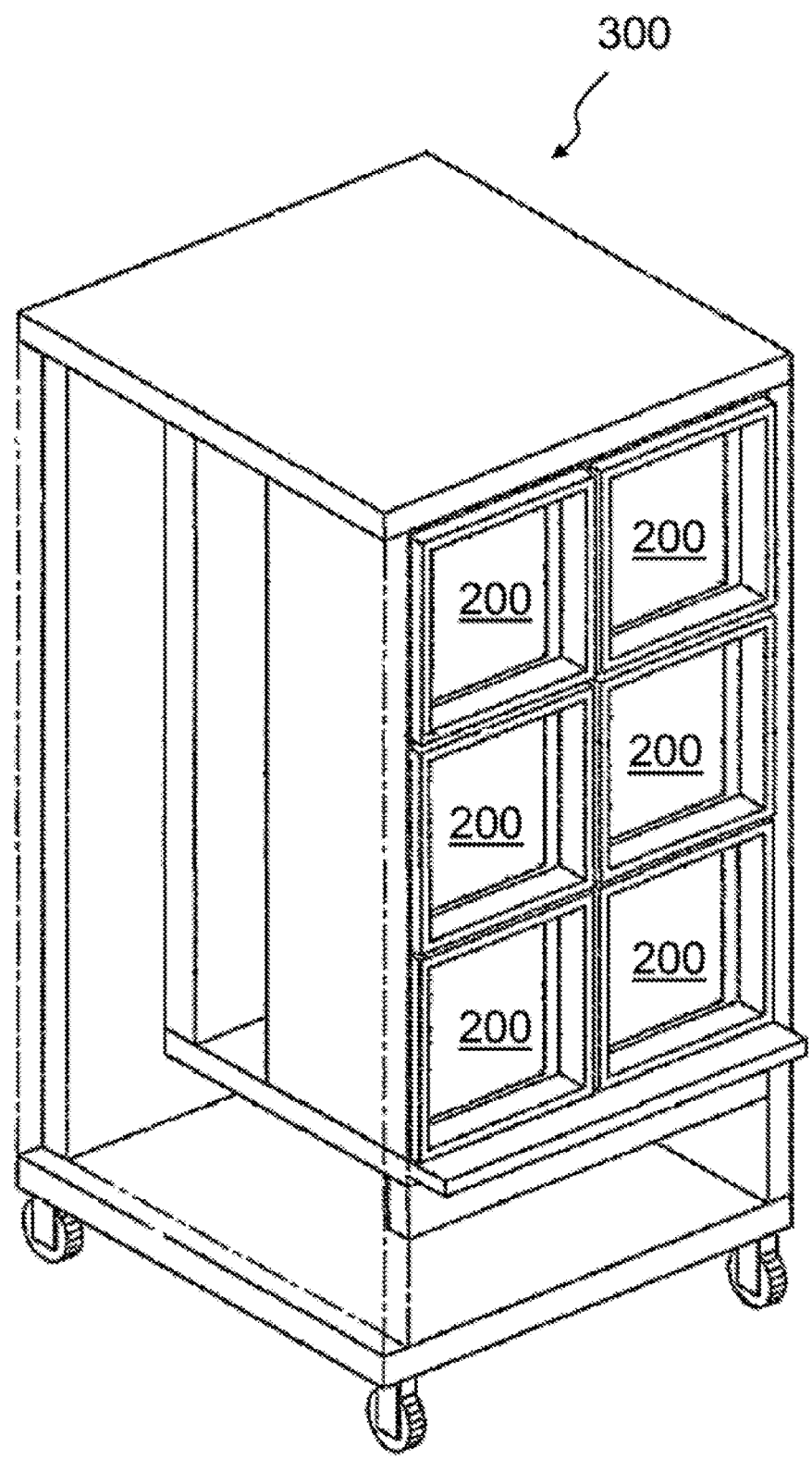
FIG. 29 shows an isometric view of a transport cart in which a plurality of interchangeable separating units are inserted.

FIG. 29 shows an isometric view of a transport cart 300, in which a plurality of interchangeable separating units 200 are inserted. They are arranged in a modular manner and can be removed individually or as a whole from the transport cart 300 as needed. Since the loaded separating units 200 have a high weight, the transport cart 300 having loaded separating units 200 can easily be removed from a coating facility and coupled on again having unloaded separating units 200.

Figure 30:
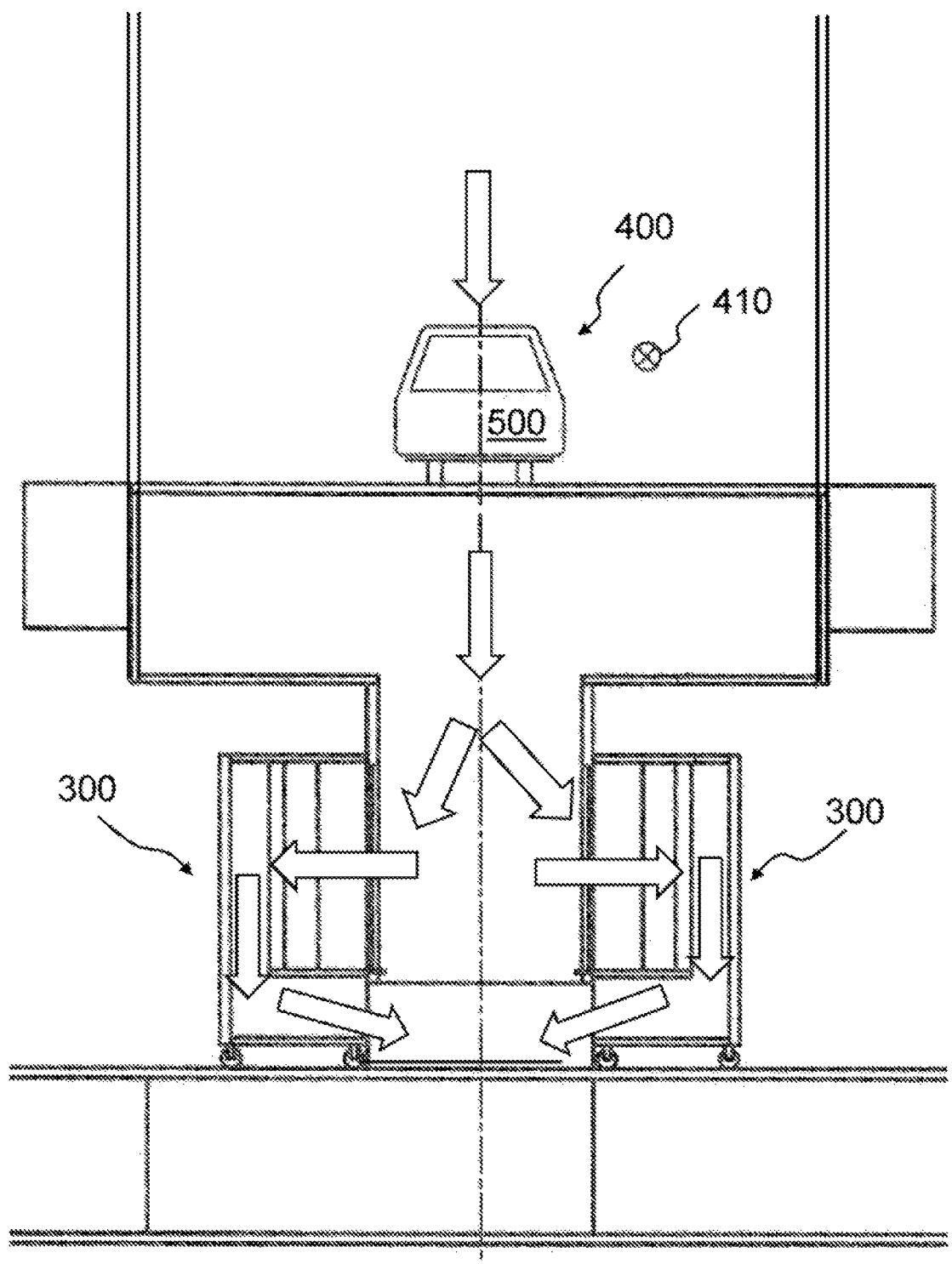
FIG. 30 shows a schematic view of a coating facility having multiple transport carts according to FIG. 29.

FIG. 30 shows a schematic view of a coating facility 400 having multiple transport carts 300 according to FIG. 29. The transport carts 300 can, for example, be arranged on both sides of the coating facility 400.

The coating facility 400 is used, for example, for painting vehicle bodies 500. The vehicle body 500 is arranged on a work platform and is sprayed with paint while it is moved in the transport direction 410, which extends perpendicular to the plane of the drawing in the figure. The air flow having paint residues flows downward in the coating facility 400 and flows through the transport carts 300 arranged on both sides. It is obvious that a plurality of transport carts 300 having separating units 200 can have the paint-laden air flow through them in parallel, wherein the plurality of transport carts 300 can also be arranged on only one side of the coating facility 400. The transport carts 300 form a fluid-conducting connection to an exhaust air duct. The paint-laden air flows through the separating units 200 of the transport carts 300 and reaches its outlet and enters the exhaust air duct in a purified state. The purified exhaust air can again be used for the painting process and can be circulated or can be exhausted from the painting facility 400. The movable transport carts 300 can be exchanged during operation in the coating facility 400.

The invention claimed is:

1. Separating unit having at least one separating stage for inertial separation of components contained in a fluid flowing through the separating unit, comprising
   a separating segment which has at least one acceleration section having an inlet and, downstream of the inlet in a through-flow direction, the separating segment having a first impaction surface for components contained in the fluid downstream of the acceleration section, wherein the first impaction surface has a baffle region and a curved portion downstream of the baffle region in the through-flow direction arranged to deflect a direction of the fluid by at least 180° with respect to the through-flow direction of the fluid in the acceleration section,
   a second impaction surface downstream of the first impaction surface in the through-flow direction, wherein the second impaction section includes a curved portion formed by a rear side of a boundary wall of the acceleration section,
   wherein an end edge of the curved portion of the first impaction surface is oriented toward the second impaction surface,
   wherein the acceleration section is designed as a nozzle having a free flow cross-section that tapers downwardly in the through-flow direction, and
   wherein the at least one separating stage is arranged in a housing wherein multiple separating stages are arranged fluidically so they can have flow through them in parallel and/or in series.

2. Separating unit as claimed in claim 1, wherein a guide element is arranged in front of or in a free flow cross section of the acceleration section.

3. Separating unit as claimed in claim 2, wherein the guide element extends parallel to an incident flow surface of the separating stage, and/or the guide element is arranged in a plane of symmetry of the free flow cross section, and/or in that the guide element has a two-dimensional cross section.

4. Separating unit as claimed in claim 1, wherein the housing has an opening on its incident flow side, the opening having an upper edge and a lower edge, wherein the upper edge and the lower edge have different heights.

5. Separating unit as claimed in claim 4, wherein a height of the lower edge is higher than a height of the upper edge.

6. Separating unit as claimed in claim 1, wherein at least one filter stage is arranged downstream of the separating stage.

7. Separating unit as claimed in claim 6, wherein the at least one filter stage has a folded filter bellows, the fold edges of which are oriented transversely to an extension of the acceleration section extending in parallel to a z-axis.

8. Separating unit as claimed in claim 1, wherein the separating stage and one or more filter stages are arranged in a common housing.

9. Separating unit as claimed in claim 1, wherein a bottom part and/or cover part has a negative contour in the form of a cross section of the at least one separating stage as a holder for the at least one separating stare.

10. Separating unit as claimed in claim 9, wherein the negative contour is formed as interrupted openings in the bottom part and/or cover part.

11. Separating unit as claimed in claim 1, wherein the separating stages are formed from a kit of components, the kit comprising blanks made of at least one of cardboard, corrugated cardboard, fiber molded parts, and deep-drawn parts made of plastic.

12. Separating unit as claimed in claim 11, wherein the blanks have predefined buckle lines and/or fold lines.

* * * * *